US012514785B2

(12) United States Patent
Trejo et al.

(10) Patent No.: US 12,514,785 B2
(45) Date of Patent: Jan. 6, 2026

(54) DISPENSING SYSTEMS AND METHODS FOR PREFILLED SYRINGES

(71) Applicant: Omnicell, Inc., Mountain View, CA (US)

(72) Inventors: Guillermo Trejo, Gilroy, CA (US); Jing Zhang, Mountain View, CA (US); Vikram Mehta, Dublin, CA (US); Gerardo Moreno, Pleasanton, CA (US); Michael Makay, Santa Clara, CA (US); Ariel David Turgel, San Francisco, CA (US); Mark Hearn, San Francisco, CA (US); Elisa Payer, San Francisco, CA (US)

(73) Assignee: Omnicell, Inc., Cranberry Township, PA (US)

( * ) Notice: Subject to any disclaimer, the term of this patent is extended or adjusted under 35 U.S.C. 154(b) by 0 days.

(21) Appl. No.: 17/867,763

(22) Filed: Jul. 19, 2022

(65) Prior Publication Data

US 2022/0347053 A1 Nov. 3, 2022

Related U.S. Application Data

(62) Division of application No. 16/681,227, filed on Nov. 12, 2019, now Pat. No. 11,426,329.

(51) Int. Cl.
*A61J 1/14* (2023.01)

(52) U.S. Cl.
CPC ........... *A61J 1/1443* (2013.01); *A61J 1/1481* (2015.05)

(58) Field of Classification Search
CPC ...... A61J 7/0445; A61J 7/0076; A61J 7/0481; A61J 1/1443; A61J 1/1481; A61F 15/001; B65D 83/0409; B65D 83/0445
(Continued)

(56) References Cited

U.S. PATENT DOCUMENTS 2,493,753 A * 1/1950 Devens .................. G07F 11/12 221/118
2,496,689 A * 2/1950 Balzer ..................... G07F 11/60 221/129
(Continued)

FOREIGN PATENT DOCUMENTS

CN 201130401 Y * 10/2008 .............. F25C 1/147
EP 0352179 A1 1/1990
(Continued)

OTHER PUBLICATIONS

Application No. CN202080091945.2 , Office Action, Mailed On Jul. 8, 2023, 8 pages.
(Continued)

*Primary Examiner* — Rakesh Kumar
(74) *Attorney, Agent, or Firm* — Kilpatrick Townsend & Stockton LLP

(57) ABSTRACT

A dispensing mechanism includes at least two helical augers having threads, and at least two channels configured to hold the items to be dispensed. The items to be dispensed are received at least partially within the threads of the augers. The dispensing mechanism includes a drive mechanism engaged with the at least two augers and configured to rotate the at least two augers to transport the items to be dispensed, driven by the threads of the augers, to dispense the items from the dispensing mechanism. The dispensing mechanism may include a separable dispenser and cassette.

34 Claims, 22 Drawing Sheets

(58) Field of Classification Search
USPC .................................................... 221/12, 277
See application file for complete search history.

(56) References Cited

U.S. PATENT DOCUMENTS 2,564,552 A * 8/1951 Verdery, Jr. ............. G07F 11/60 221/75
2,954,129 A * 9/1960 Gordon ................... A47F 1/126 211/59.3
3,036,730 A * 5/1962 Newberry ............... G07F 11/36 221/75
3,126,123 A 3/1964 Pickering
3,135,425 A 6/1964 Korr
3,162,494 A * 12/1964 Tassie ..................... G07F 11/60 312/35
3,194,432 A 7/1965 Breitenstein et al.
3,258,153 A 6/1966 Morgan et al.
3,273,748 A * 9/1966 De Shon ................. G07F 11/36 221/6
3,335,907 A * 8/1967 Holstein ................. G07F 11/42 221/6
3,355,064 A 11/1967 Schlaf
3,369,697 A 2/1968 Glucksman et al.
3,441,174 A * 4/1969 Kenney ................... G07F 11/56 221/75
3,469,738 A * 9/1969 Schuller .................. A47F 1/125 221/75
3,512,679 A 5/1970 Stoltz
3,591,045 A * 7/1971 Sturrock ................. G07F 11/42 221/75
3,677,437 A 7/1972 Haigler
3,815,781 A * 6/1974 Armstrong ............. B65G 33/04 221/75
3,938,699 A * 2/1976 Wittern ................... G07F 11/58 221/85
3,986,637 A * 10/1976 Wittern ................... G07F 11/36 221/75
3,989,163 A * 11/1976 Wittern ................... G07F 11/42 221/75
3,993,215 A * 11/1976 Cox ........................ G07F 11/42 221/75
4,039,181 A 8/1977 Prewer
4,061,245 A * 12/1977 Lotspeich ............... G07F 11/60 221/75
4,266,563 A 5/1981 Fujita
4,310,103 A 1/1982 Reilly, Jr. et al.
4,368,829 A * 1/1983 Lotspeich ............... G07F 11/60 221/75
4,444,334 A * 4/1984 Hughes, Jr. ........... G07F 11/004 221/75
4,469,242 A * 9/1984 Costa ...................... G07F 11/58 221/75
4,573,606 A 3/1986 Lewis et al.
4,600,119 A * 7/1986 Olson ..................... G07F 11/42 221/75
4,671,426 A * 6/1987 Grossi ..................... G07F 11/60 221/75
4,674,653 A * 6/1987 Suzuki ...................... G07F 9/02 221/6
4,757,915 A * 7/1988 Albright ................. G07F 11/42 221/75
4,844,294 A * 7/1989 Albright ................. G07F 11/42 221/75
4,872,591 A 10/1989 Konopka
4,944,414 A * 7/1990 Albright ................. G07F 11/42 211/59.3
5,148,944 A 9/1992 Kaufman et al.
5,176,285 A 1/1993 Shaw
5,190,185 A 3/1993 Blechl
5,197,632 A 3/1993 Kaufman et al.
5,307,941 A * 5/1994 Siegal ..................... B42F 17/02 211/11
5,329,459 A 7/1994 Kaufman et al.
5,341,954 A * 8/1994 Smith ..................... G07F 11/42 221/85
5,377,864 A 1/1995 Blechl et al.
5,402,911 A 4/1995 Noell
5,509,573 A * 4/1996 Campoli ................. G07F 11/42 221/133
5,542,570 A * 8/1996 Nottingham ............ G07F 11/44 221/277
5,671,262 A 9/1997 Boyer et al.
5,690,251 A * 11/1997 Wade ........................ G07F 9/02 221/277
5,745,366 A 4/1998 Higham et al.
5,755,357 A 5/1998 Orkin et al.
5,805,455 A 9/1998 Lipps
5,805,456 A 9/1998 Higham et al.
5,905,653 A 5/1999 Higham et al.
5,927,540 A 7/1999 Godlewski
5,996,838 A * 12/1999 Bayer ..................... G07F 11/42 221/241
6,004,020 A 12/1999 Bartur
6,011,999 A 1/2000 Holmes
6,039,467 A 3/2000 Holmes
6,056,152 A * 5/2000 Gonzalez ................ G07F 9/105 221/199
6,151,536 A 11/2000 Arnold et al.
6,170,929 B1 1/2001 Wilson et al.
6,272,394 B1 8/2001 Lipps
6,385,505 B1 5/2002 Lipps
6,505,755 B1 * 1/2003 Voss ....................... G07D 11/10 221/84
6,609,047 B1 8/2003 Lipps
6,640,159 B2 10/2003 Holmes et al.
6,760,643 B2 7/2004 Lipps
6,975,922 B2 12/2005 Duncan et al.
7,006,894 B2 2/2006 De La Huerga
7,066,348 B2 * 6/2006 Skavnak ................. G07F 11/42 221/75
7,320,412 B2 1/2008 Fitzgerald
7,337,594 B2 3/2008 Sus et al.
7,348,884 B2 3/2008 Higham
7,367,471 B1 * 5/2008 Ip ........................... G07F 11/36 221/75
7,571,024 B2 8/2009 Duncan et al.
7,597,214 B2 * 10/2009 Levasseur ............... G07F 11/24 221/124
7,675,421 B2 3/2010 Higham
7,835,819 B2 11/2010 Duncan et al.
7,934,271 B2 5/2011 Soller et al.
7,978,564 B2 7/2011 De La Huerga
8,027,749 B2 9/2011 Vahlberg et al.
8,052,010 B2 11/2011 Borra
8,073,563 B2 12/2011 Vahlberg et al.
8,126,590 B2 2/2012 Vahlberg et al.
8,131,397 B2 3/2012 Vahlberg et al.
8,140,186 B2 3/2012 Vahlberg et al.
8,155,786 B2 4/2012 Vahlberg et al.
8,936,175 B1 1/2015 Song
9,113,729 B2 8/2015 Righetti et al.
9,147,304 B2 * 9/2015 Gemberling, Jr. ...... G07F 11/42
9,336,545 B2 * 5/2016 Shimmerlik .......... B60P 3/0257
9,589,411 B2 * 3/2017 Shimmerlik ............ G07F 11/04
9,818,251 B2 11/2017 Wilson et al.
10,019,609 B2 7/2018 Jammet
10,251,816 B2 4/2019 Wilson et al.
10,262,490 B2 4/2019 Wilson et al.
10,327,996 B2 6/2019 Fisher et al.
10,535,214 B2 1/2020 Nooli et al.
10,832,511 B2 * 11/2020 Shimmerlik .......... G07F 11/004
11,251,793 B2 * 2/2022 Staev .................. G07F 17/0071
11,426,329 B2 8/2022 Trejo et al.
2001/0000610 A1 * 5/2001 Johnson .................. G07F 11/42 221/133
2001/0030197 A1 * 10/2001 Gates ...................... G07F 11/60 221/124
2003/0155367 A1 8/2003 Chen
2004/0225409 A1 * 11/2004 Duncan ................... G07F 11/62 700/236

(56) References Cited

U.S. PATENT DOCUMENTS

| | | | | |
|---|---|---|---|---|
| 2008/0236558 | A1* | 10/2008 | Bosch | F41B 11/57 124/48 |
| 2008/0319577 | A1 | 12/2008 | Vahlberg et al. | |
| 2008/0319579 | A1 | 12/2008 | Vahlberg et al. | |
| 2008/0319789 | A1 | 12/2008 | Vahlberg et al. | |
| 2008/0319790 | A1 | 12/2008 | Vahlberg et al. | |
| 2010/0042437 | A1 | 2/2010 | Levy et al. | |
| 2010/0046318 | A1* | 2/2010 | Holt | B30B 11/005 366/76.2 |
| 2010/0070074 | A1* | 3/2010 | Duncan | G07F 11/60 221/6 |
| 2010/0280655 | A1* | 11/2010 | Wilson | G07F 11/42 211/59.3 |
| 2012/0035760 | A1 | 2/2012 | Portney | |
| 2014/0061227 | A1* | 3/2014 | Chen | G07F 11/42 221/277 |
| 2014/0061228 | A1* | 3/2014 | Chen | G07F 11/42 221/277 |
| 2014/0061229 | A1* | 3/2014 | Chen | G07F 11/42 221/277 |
| 2014/0076921 | A1* | 3/2014 | Chen | G07F 11/24 221/277 |
| 2016/0253860 | A1 | 9/2016 | Wilson et al. | |
| 2017/0186263 | A1 | 6/2017 | Shimmerlik et al. | |
| 2019/0060175 | A1 | 2/2019 | Wilson et al. | |
| 2019/0062038 | A1 | 2/2019 | Wilson et al. | |
| 2019/0130692 | A1 | 5/2019 | Wilson et al. | |
| 2020/0304322 | A1* | 9/2020 | Castle | B41J 2/17503 |
| 2023/0397516 | A1* | 12/2023 | NewDelman | A01B 49/065 |
| 2025/0001690 | A1* | 1/2025 | Lesney | B33Y 70/00 |

FOREIGN PATENT DOCUMENTS

| | | | | |
|---|---|---|---|---|
| EP | 1881464 | A1 * | 1/2008 | G07F 11/36 |
| EP | 3220365 | A1 * | 9/2017 | G07F 11/36 |
| JP | 2007175523 | A | 7/2007 | |
| JP | 2020532344 | A | 11/2020 | |
| KR | 20170120172 | A | 10/2017 | |
| TW | M322038 | U | 11/2007 | |
| WO | WO-0127739 | A1 * | 4/2001 | G06Q 20/20 |
| WO | WO-0173704 | A2 * | 10/2001 | G07F 11/44 |
| WO | WO-03025478 | A1 * | 3/2003 | F25C 1/147 |

OTHER PUBLICATIONS

Application No. JP2022-527084 , Notice of Allowance, Mailed On Aug. 1, 2023, 6 pages.

U.S. Appl. No. 16/681,227, Corrected Notice of Allowability mailed on Jul. 29, 2022, 9 pages.

U.S. Appl. No. 16/681,227, Final Office Action mailed on Oct. 15, 2021, 16 pages.

U.S. Appl. No. 16/681,227, Non-Final Office Action mailed on Jan. 3, 2022, 16 pages.

U.S. Appl. No. 16/681,227, Non-Final Office Action mailed on Mar. 30, 2021, 19 pages.

U.S. Appl. No. 16/681,227, Notice of Allowance mailed on Apr. 15, 2022, 12 pages.

Canadian Application No. 3,158,510, Office Action mailed on Aug. 5, 2024, 4 pages.

Canadian Application No. 3,158,510, Office Action mailed on Sep. 29, 2023, 4 pages.

Chinese Application No. 202080091945.2, Notice of Decision to Grant mailed on Mar. 14, 2024, 6 pages (4 pages of Original document and 2 pages of English Translation).

European Application No. 20886286.2, Extended European Search Report mailed on Oct. 13, 2023, 9 pages.

Japanese Application No. 2022-527084, Office Action mailed on Apr. 11, 2023, 3 pages.

Korean Application No. 10-2022-7017150, Office Action mailed on Jun. 14, 2024, 14 pages (7 pages of original document and 7 pages of English Translation).

Korean Application No. 10-2022-7017150, Office Action mailed on Aug. 28, 2024.

International Application No. PCT/US2020/055909, International Preliminary Report on Patentability mailed on May 27, 2022, 8 pages.

International Application No. PCT/US2020/055909, International Search Report and Written Opinion mailed on Jan. 14, 2021, 9 pages.

Brazilian Application No. 112022008093-0, Office Action mailed on Aug. 27, 2024, 4 pages.

European Application No. 20886286.2, Intention to Grant mailed on Oct. 17, 2024, 9 pages.

* cited by examiner

DISPENSING SYSTEMS AND METHODS FOR PREFILLED SYRINGES

CROSS-REFERENCE TO RELATED APPLICATIONS

This application is a Divisional of and claims the benefit of U.S. Non-Provisional application Ser. No. 16/681,227, filed on Nov. 12, 2019, entitled "DISPENSING SYSTEMS AND METHODS FOR PREFILLED SYRINGES", the disclosure of which is incorporated by reference herein in its entirety.

BACKGROUND OF THE INVENTION

Many industries rely on the accurate inventory and dispensing of secure items. For example, in a hospital setting, it is of paramount importance that patients be given the correct medications in the correct doses. In addition, it is legally required that controlled substances be secured and accurately tracked, and it is also important that inventories of medications and supplies be tracked so that proper business controls can be implemented.

Various dispensing cabinets and carts have been developed to assist in the management of medications and other items. However, improvements are still desired in the reliability of dispensing and tracking of items, and it is also desirable to reduce the amount of space required for item storage and dispensing.

BRIEF SUMMARY OF THE INVENTION

According to one aspect, a dispensing mechanism for dispensing elongate items includes at least two helical augers having threads, and at least two channels configured to hold the items to be dispensed with the longitudinal axes of the items to be dispensed being generally perpendicular to the rotational axes of the at least two helical augers. The items to be dispensed are received at least partially within the threads of the augers. The dispensing mechanism also includes a drive mechanism engaged with the at least two augers and configured to rotate the at least two augers to transport the items to be dispensed, driven by the threads of the augers, to dispense the items from the dispensing mechanism.

DETAILED DESCRIPTION OF THE INVENTION

Figure 1:
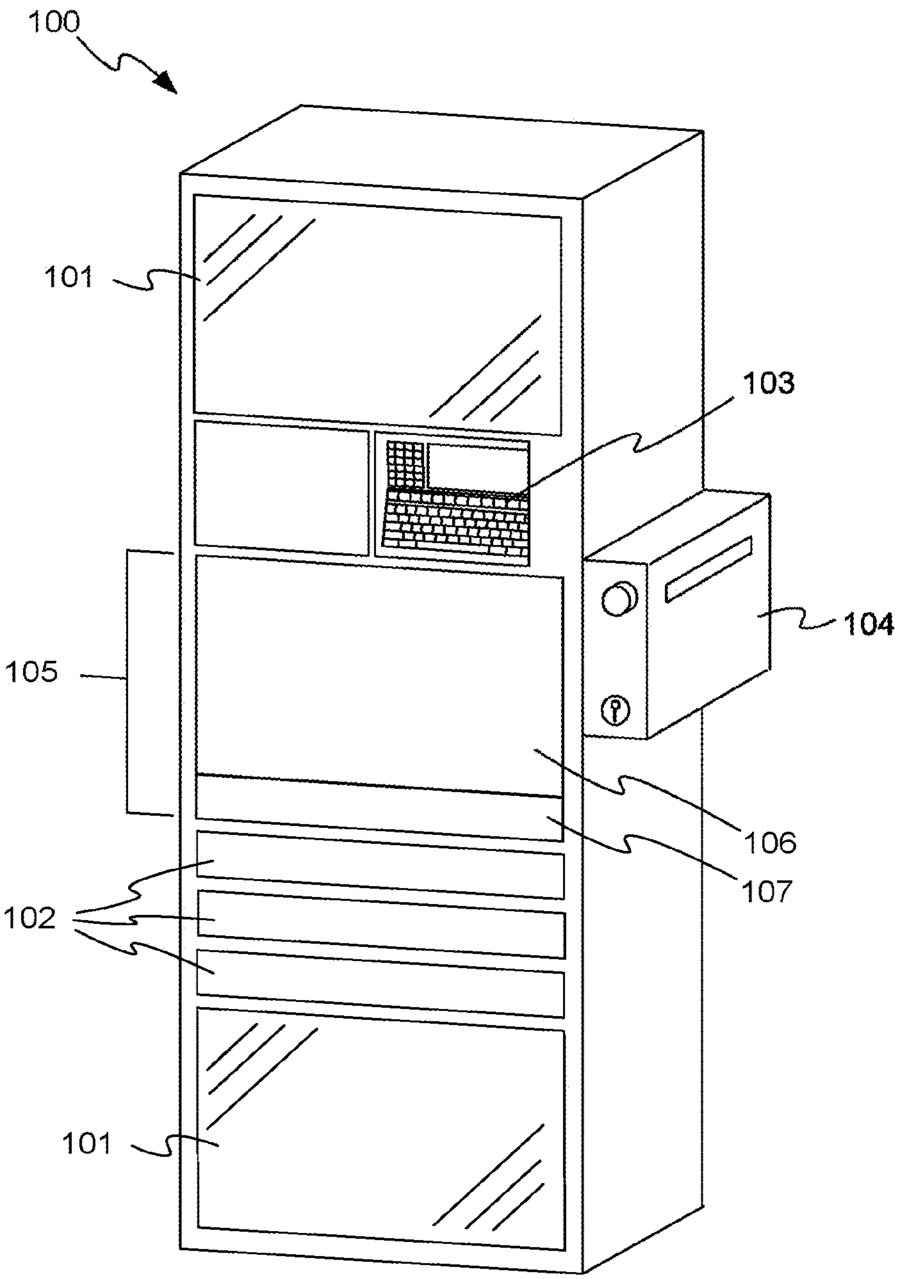
FIG. 1 illustrates an example cabinet in which the invention may be embodied.

FIG. 1 illustrates an example cabinet 100 in which the invention may be embodied. Cabinet 100 includes various doors 101 and drawers 102 providing access to compartments for storing items such as medical supplies or medications. For example, supplies such as bandages, swabs, and the like may be stored in unlocked compartments such as may be accessed through one of doors 101. Medications may be stored in individually lockable compartments within drawers such as drawers 102. A computer 103 maintains records of the contents of cabinet 100, and may control access to individual compartments. For example, a floor nurse needing to obtain a dose of medication for a hospital patient may enter his or her identification and the medication required into computer 103. Computer 103 verifies that the nurse is authorized to remove the medication, and unlocks a particular drawer 102 and a particular compartment within the drawer containing the required medication. Computer 103 may also control lights that guide the nurse to the correct drawer and compartment, to help ensure that the correct medication is dispensed. In addition, computer 103 may communicate with a central computer system that coordinates information from many storage and dispensing devices such as cabinet 100.

While embodiments of the invention are described in the context of stationary cabinet 100, it will be recognized that the invention may be embodied in other kinds of storage devices, for example movable cabinets, carts, storage rooms, and the like. Example dispensing devices are described in the following commonly owned U.S. patents and patent applications, the contents of which are hereby incorporated by reference: U.S. Pat. No. 6,272,394, issued on Aug. 7, 2001 to Lipps, U.S. Pat. No. 6,385,505, issued on May 7, 2002 to Lipps, U.S. Pat. No. 6,760,643, issued on Jul. 6, 2004 to Lipps, U.S. Pat. No. 5,805,455, issued on Sep. 8, 1998 to Lipps, U.S. Pat. No. 6,609,047, issued on Aug. 19, 2003 to Lipps, U.S. Pat. No. 5,805,456, issued on Sep. 8, 1998 to Higham et al., U.S. Pat. No. 5,745,366, issued on Apr. 28, 1998 to Higham et al., an U.S. Pat. No. 5,905,653, issued on May 18, 1999 to Higham et al., U.S. Pat. No. 5,927,540, issued on Jul. 27, 1999 to Godlewski, U.S. Pat. No. 6,039,467, issued on Mar. 21, 2000 to Holmes, U.S. Pat. No. 6,640,159, issued on Oct. 28, 2003 to Holmes et al., U.S. Pat. No. 6,151,536, issued on Nov. 21, 2000 to Arnold et al., U.S. Pat. No. 5,377,864, issued on Jan. 3, 1995 to Blechl et al., U.S. Pat. No. 5,190,185, issued on Mar. 2, 1993 to Blechl, U.S. Pat. No. 6,975,922, issued on Dec. 13, 2005 to Duncan et al., U.S. Pat. No. 7,571,024, issued on Aug. 4, 2009 to Duncan et al., U.S. Pat. No. 7,835,819, issued on Nov. 16, 2010 to Duncan et al., U.S. Pat. No. 6,011,999, issued on Jan. 4, 2000 to Holmes, U.S. Pat. No. 7,348,884, issued on Mar. 25, 2008 to Higham, U.S. Pat. No. 7,675,421, issued on Mar. 9, 2010 to Higham, U.S. Pat. No. 6,170,929, issued on Jan. 9, 2001 to Wilson et al., U.S. Pat. No. 8,155,786 to Vahlberg et al., issued on Apr. 10, 2012, U.S. Pat. No. 8,073,563 to Vahlberg et al., issued on Dec. 6, 2011, U.S. Patent Application Publication No. 2008/0319577 of Vahlberg et al., published on Dec. 25, 2008, U.S. Pat. No. 8,140,186 to Vahlberg et al., issued on Mar. 20, 2012, U.S. Pat. No. 8,126,590 to Vahlberg et al., issued on Feb. 28, 2012, U.S. Pat. No. 8,027,749 to Vahlberg et al., issued on Sep. 27, 2011, U.S. Patent Application Publication No. 2008/0319790 of Vahlberg et al., published on Dec. 25, 2008, U.S. Patent Application Publication No. 2008/0319789 of Vahlberg et al., published on Dec. 25, 2008, U.S. Pat. No. 8,131,397 to Vahlberg et al., issued on Mar. 6, 2012, U.S. Patent Application Publication No. 2008/0319579 of Vahlberg et al., published on Dec. 25, 2008, and U.S. Patent Application Publication No. 2010/0042437 of Levy et al., published on Feb. 18, 2010. Embodiments of the present invention may incorporate features from the devices described in these documents, in any workable combination.

In the above scenario, the nurse may be given access to a compartment having a large number of doses of the medication, and he or she may simply remove the number immediately required.

Cabinet 100 also includes a return bin 104, into which unused items can be placed, for later return to stock by a pharmacy technician.

When further control and tracking accuracy is required, medications may be placed in a dispensing unit such as dispensing unit 105. Dispensing unit 105 includes a restock drawer 106 and a dispense drawer 107. Restock drawer includes in turn a number of dispensing mechanisms (not visible in FIG. 1) that, under control of computer 103, can dispense single items into dispense drawer 107. Dispense drawer 107 can then be opened to retrieve the dispensed items. Restock drawer 106 is accessible only by specially-authorized persons, for example for restocking by a pharmacy technician.

Figure 2:
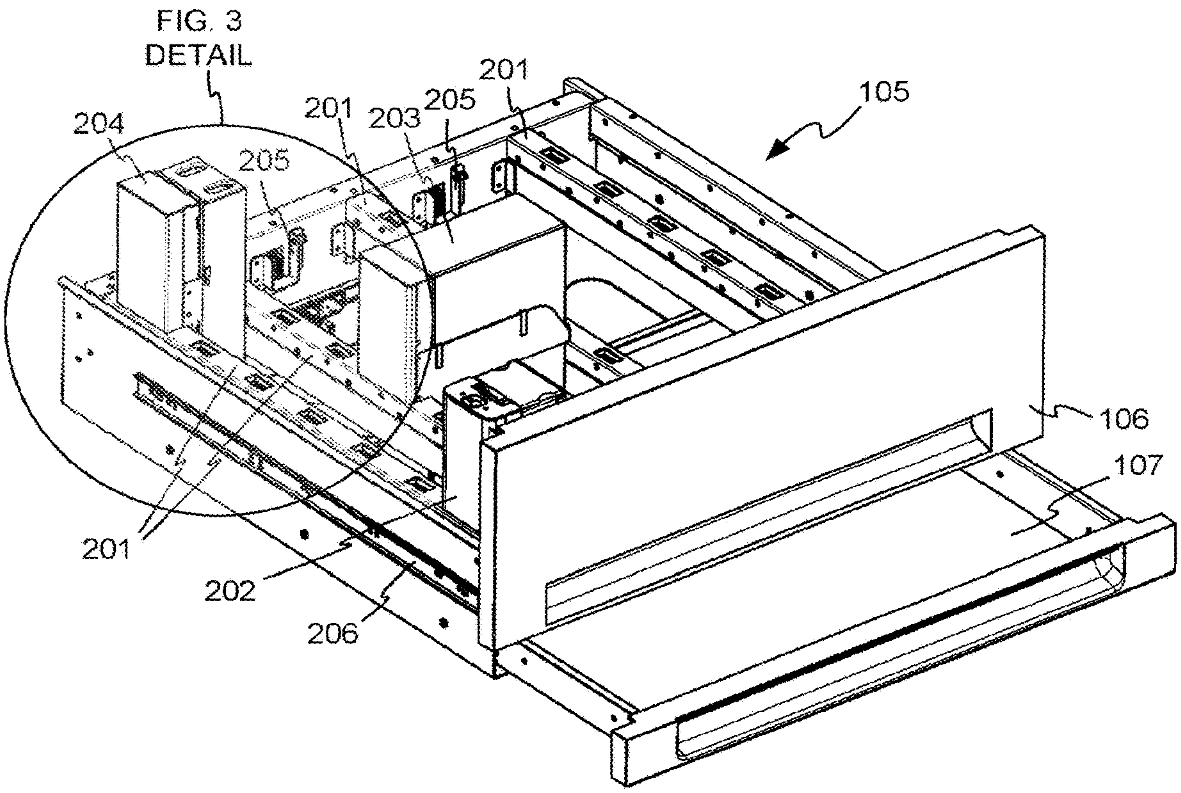
FIG. 2 illustrates a dispensing unit in accordance with embodiments of the invention.

FIG. 2 illustrates dispensing unit 105 in more detail, including restock drawer 106 and dispense drawer 107. A number of dispensing mechanisms may be installed within restock drawer by 106 attaching them to rails 201. Only a few dispensing mechanisms 202, 203, 204 are shown in FIG. 2. Different types of dispensing mechanisms may be present, depending on the kinds of items to be dispensed, as is discussed in more detail below. The different kinds of dispensing mechanisms may be of differing sizes, and rails 201 may be configured as necessary to accommodate a particular mix of dispensing mechanisms, by fixing rails 201 to different sets of hangers 205.

For example, dispensing mechanism 203 is a double width mechanism, placed between rails that are two bays wide, while dispensing mechanisms 202 and 204 are single width mechanisms, placed between rails 201 that are connected to adjacent sets of hangers 205. Other sizes of dispensers, for example triple and quadruple widths are also possible.

FIG. 2 also illustrates that dispense drawer 107 and restock drawer 106 form a nested pair of drawers. That is, restock drawer 106 can slide out of cabinet 100 on guides 206 for restocking, maintenance, and the like, carrying dispense drawer 107 with restock drawer 106. Similarly, dispense drawer 107 can slide in and out of restock drawer 106 on similar guides not easily visible in FIG. 2.

In some embodiments, dispense drawer 107 may conveniently serve as a work surface for the user of cabinet 100 or a similar device. For example, once an item has been dispensed into dispense drawer 107 and the user has opened dispense drawer 107 to retrieve the item, the user may use the flat bottom of dispense drawer 107 to rest a note pad, computer, or other item he or she may use to document or make notes about the transaction. Dispensing unit 105 may include features to facilitate the use of dispense drawer 107 as a work surface. For example, the guides or other slide mechanism by which dispense drawer opens may include a detent at the openmost position of dispense drawer 107, to lend stability to dispense drawer 107 while it is used as a work surface.

Figure 3:
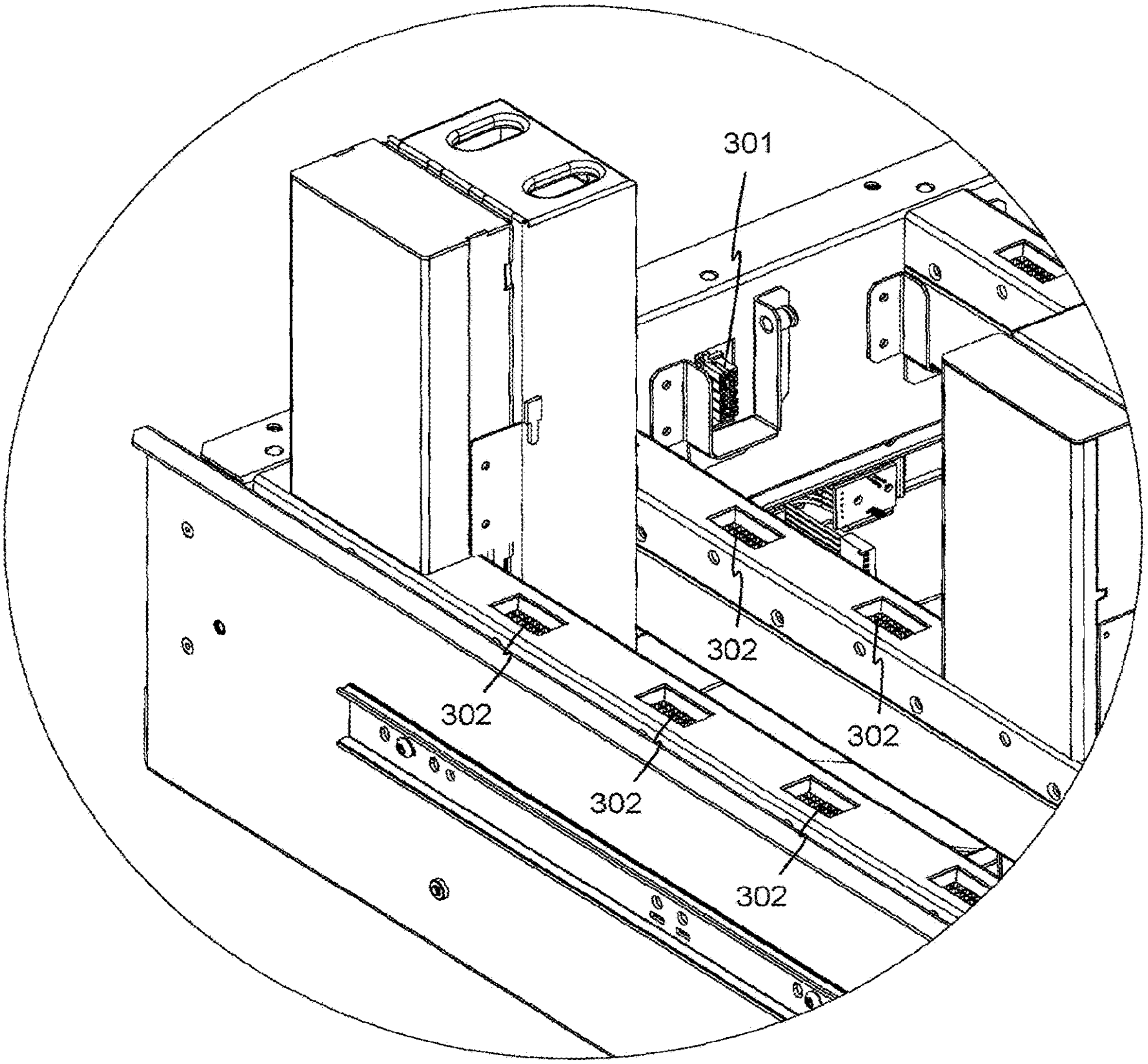
FIG. 3 is a detail view of a portion of FIG. 2.

FIG. 3 is a detail view of a portion of FIG. 2, showing that at each hanger 205 is an electrical connector 301. Each connector 301 connects with a mating connector attached to wiring within a rail 201 positioned at the respective hanger 205, supplying power and signals coming from other systems within cabinet 100. Other connectors 302 are spaced along the rails, for making electrical connections with the dispensing mechanisms such as dispensing mechanisms 202, 203, and 204. To accomplish the required electrical connections, each rail 201 may house a wiring harness, a printed circuit board assembly (PCBA), or the like. Thus, computer 103 can communicate individually with any dispensing mechanism within restock drawer 106. Cabling from all of the connectors converges at a circuit board (not visible) at the back of dispensing unit 105, which in turn connects to other electronics within cabinet 100 via one or more flexible cables (not visible in FIG. 3), which permits dispensing unit 105 to slide out of cabinet 100 for restocking, maintenance, and the like.

Figure 4A:
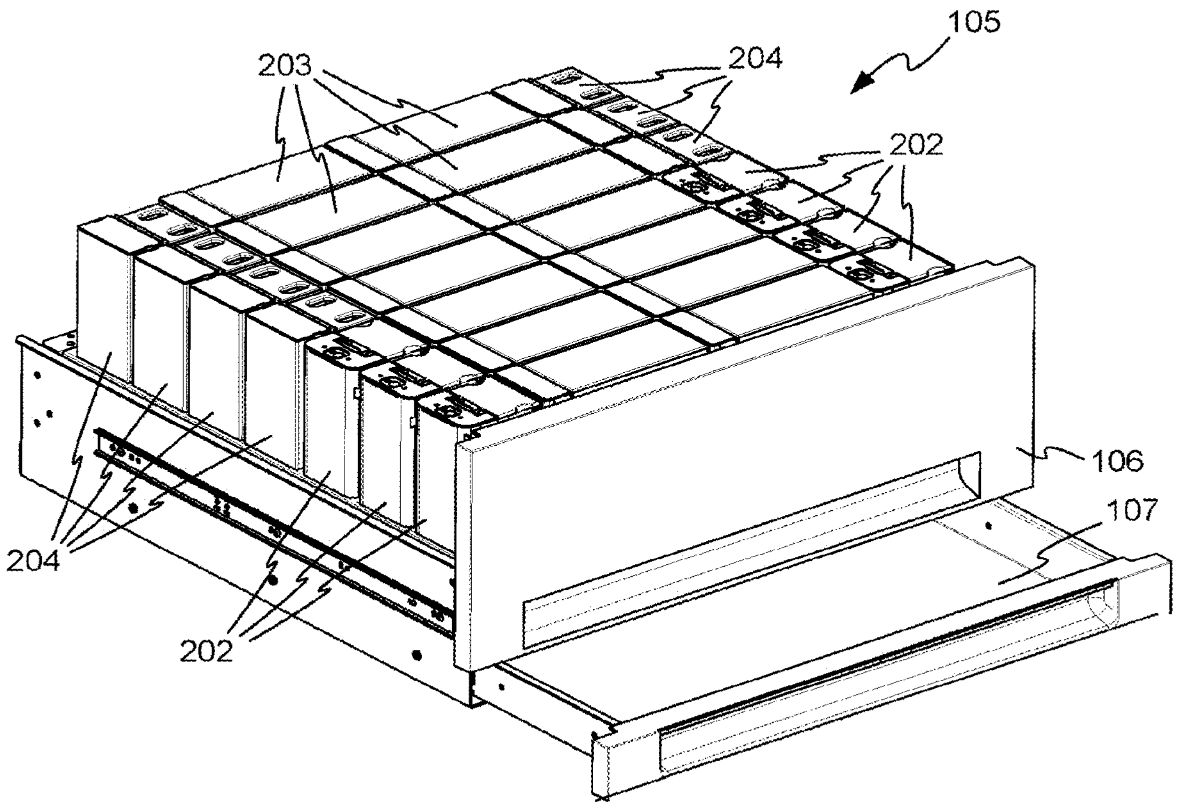
FIG. 4A illustrates the dispensing unit of FIG. 2 fully loaded with dispensing mechanisms.
Figure 4B:
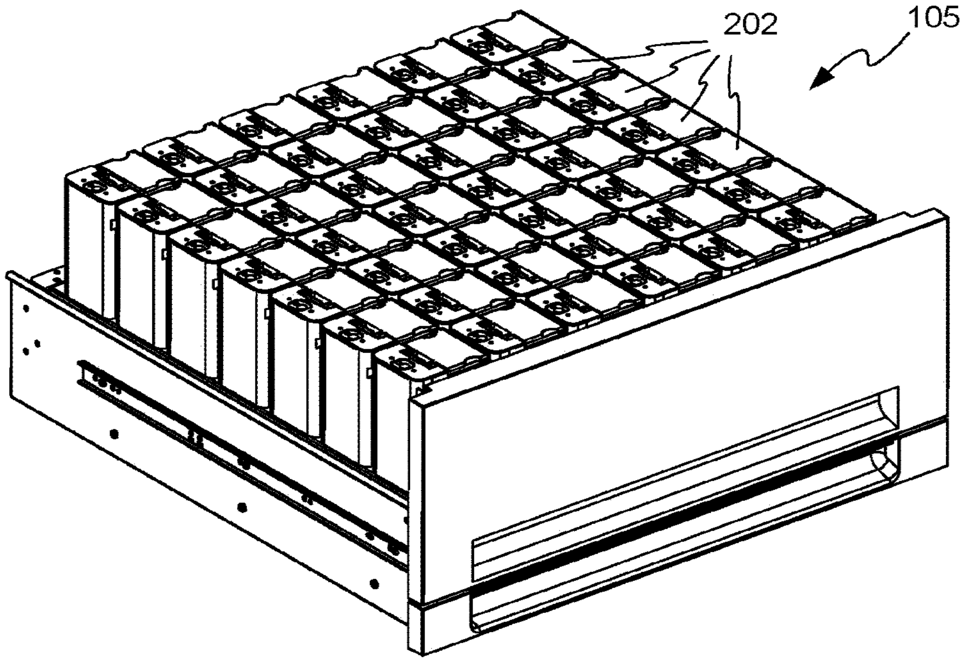
FIG. 4B illustrates the dispensing unit of FIG. 2 fully loaded with a different mix of dispensing mechanisms.

FIG. 4A illustrates dispensing unit 105 fully loaded with seven dispensing mechanisms 202, 14 dispensing mechanisms 203, and seven dispensing mechanisms 204, fully populating the available spaces on rails 201. It will be recognized that this arrangement of dispensing units is but one example of many, many arrangements of dispensing units that could be employed. For example, restock drawer 106 may not be fully populated with dispensing units. Only one or two different kinds of dispensing mechanisms may be present, or four or more kinds of dispensing units may be present. Different kinds of dispensing units may be present in any workable proportions, and like dispensing units need not be installed next to each other. Example dispensing unit 105 can hold up to 42 single width dispensing mechanisms (with two additional rails 201 installed). One example of this is shown in FIG. 4B, in which dispensing unit is loaded with 42 dispensing mechanisms 202.

Preferably, each dispensing unit can identify itself through its respective connector 302, and computer 103 can create a map of the particular arrangement of dispensing units that are installed. Computer 103 can also preferably detect the presence of a dispensing unit at any one of the bay positions, through the respective connector 302 or via a separate sensor. In addition, each dispensing unit can preferably also communicate to computer 103 the kind and quantity of items it contains and stands ready to dispense.

Figure 5:
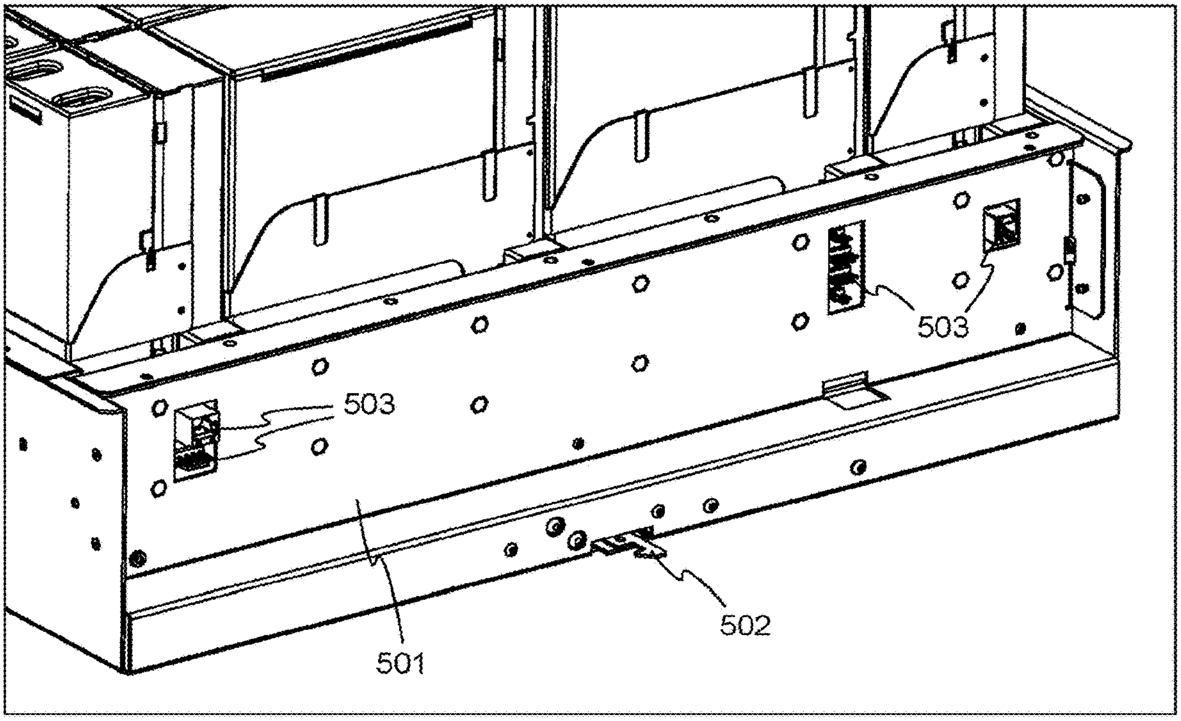
FIG. 5 is a reverse angle view of a portion of the fully-loaded dispensing unit of FIG. 4A.

FIG. 5 is a reverse angle view of a portion of the fully-loaded dispensing unit 105 of FIG. 4A, showing a back panel 501 of restock drawer 106. Preferably, both restock drawer 106 and dispense drawer 107 include latching mechanisms operable by computer 103, to prevent the opening of the drawers at improper times. For example, computer 103 may permit restock drawer 106 to be opened only when computer 103 has received a proper security code from a restocking technician, and may permit dispense drawer 107 to be opened only after an item has been dispensed from one of dispensing mechanisms 202, 203, 204. A latching mechanism 502 for locking and unlocking restock drawer 106 is visible in FIG. 5. A similar latching mechanism may be provided inside restock drawer 106 for locking and unlocking dispense drawer 107. Also visible in FIG. 5 are various connectors 503 for connecting to other electronics within cabinet 100, for example a power supply, computer 103, or other electronic components through one or more flexible cables (not shown).

A wide variety of dispensing mechanisms has been developed for dispensing different kinds of items, for example syringes, vials, single medicine doses in blister packs, and the like. A number of such dispensing mechanisms are described in U.S. Pat. No. 9,818,251 to Wilson et al., issued Nov. 14, 2017; U.S. Pat. No. 10,262,490 to Wilson et al., issued Apr. 16, 2019; U.S. Patent Application Publication No. 2019/0130692 of Wilson et al., published May 2, 2019; U.S. Patent Application Publication No. 2019/0060175 of Wilson et all, published Feb. 28, 2019; U.S. Pat. No. 10,251,816 to Wilson et al., issued Apr. 9, 2019; U.S. Patent Application Publication No. 2019/0062038 of Wilson et al., published Feb. 28, 2019; and U.S. Pat. No. 10,327,996 to Wilson et al., issued Jun. 25, 2019, the entire disclosures of which are hereby incorporated by reference herein for all purposes.

Figure 6:
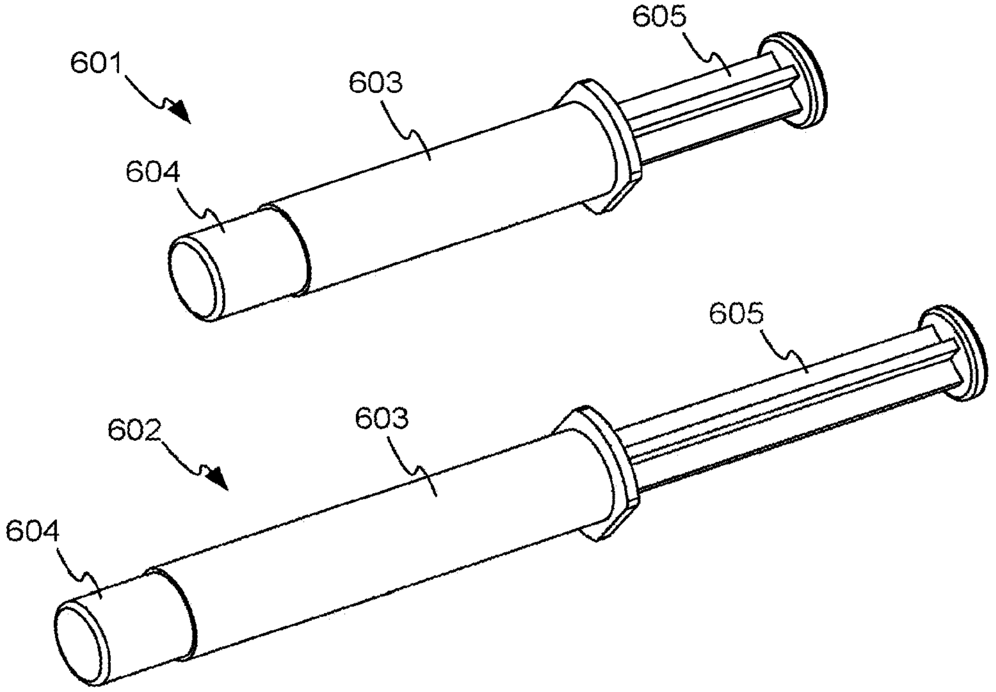
FIG. 6 illustrates two pre-filled syringes, in different sizes, usable in embodiments of the invention.

However, the dispensing mechanisms described in those documents may not be suitable for dispensing certain other items having other shapes. For example, some medications are available in pre-filled syringes. FIG. 6 illustrates two pre-filled syringes 601 and 602, in different sizes. Although other sizes are possible, syringe 601 may be a "one milliliter" (1 ml) syringe, carrying a 1 ml dose of previously prepared medication, and syringe 602 may be a "two milliliter" (2 ml) syringe, carrying a 2 ml dose of medication. Each of syringes 601 and 602 has a body 603 containing the medication, a luer connector 604 for connecting the syringe to an infusion port or a needle, and a plunger 605. As is apparent, the body 603 of 2 ml syringe 602 is longer than the body 603 of 1 ml syringe 601, so as to store more medication. Accordingly, the plunger 605 of 2 ml syringe 602 is longer than the plunger 605 of 1 ml syringe 602, so as to permit expelling all of the medication from the longer body. Preferably, syringes usable in embodiments of the invention are the same or similar in diameter.

Prefilled syringes may simplify medication management in a hospital or other health care facility. Because medications can be purchased already in the appropriate syringe, there is no need to compound the medication or fill the syringe at the health care facility, saving time and avoiding potential errors. Syringes may be available holding a variety of medications in a variety of doses. Prefilled syringes may be especially attractive for controlled substances such as narcotics, for which it is especially important to simplify medication tracking and avoid medication errors.

Figure 7:
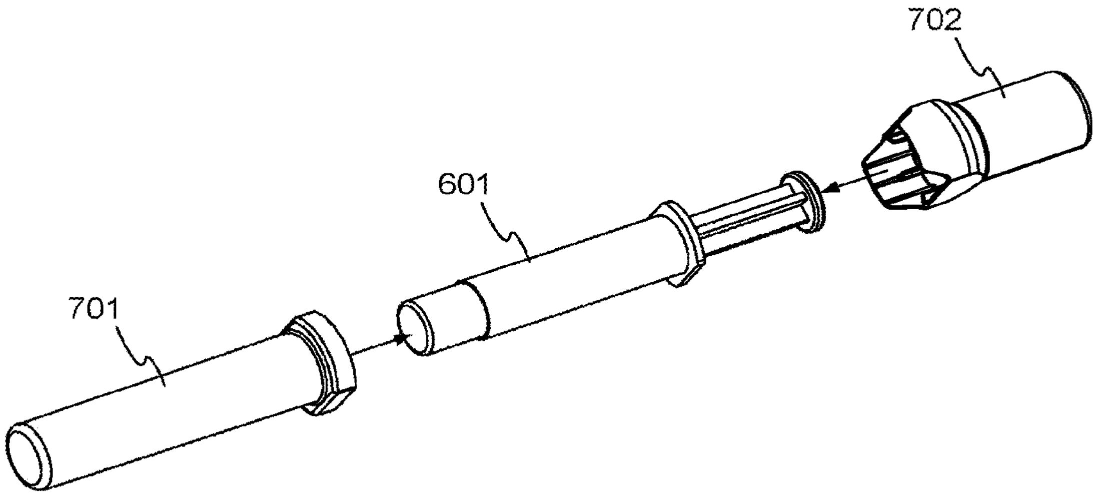
FIG. 7 shows a body cap and a plunger cap sized to snap together to enclose one of the syringes of FIG. 6, in accordance with embodiments of the invention.
Figure 8:
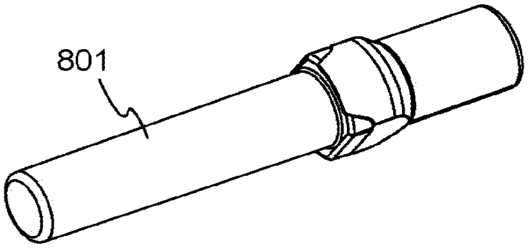
FIG. 8 shows the completed assembly of a syringe capsule, in accordance with embodiments of the invention.

For protection during dispensing, a syringe such as syringe 601 or syringe 602 may be placed in a protective capsule. FIG. 7 shows a body cap 701 and a plunger cap 702 sized to snap together to enclose syringe 601. Body cap 701 and plunger cap 702 may preferably be made of an inexpensive, sterilizable polymer such as polypropylene, although any suitable material may be used. Body cap 701 and plunger cap 702 may be disposable and used only once, or may be reusable. FIG. 8 shows the completed assembly of a syringe capsule 801. A similar (but longer) capsule may be provided for larger syringe 602.

In the discussion below, the term "syringe" or the term "capsule" may sometimes be used to refer to the combination of a syringe and its protective capsule. For example, when a syringe in a capsule is dispensed, this may be referred to as simply dispensing a syringe or dispensing a capsule.

Figure 9B:
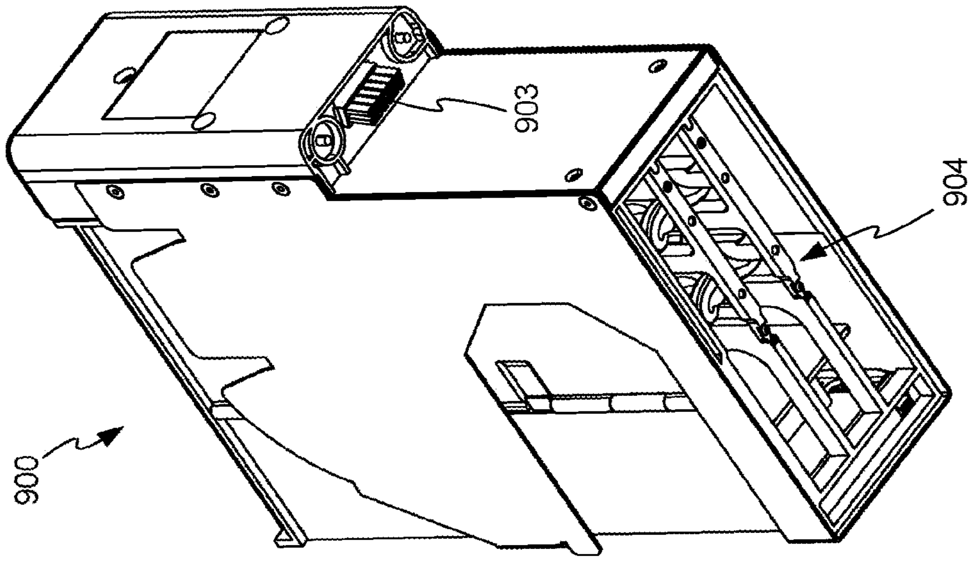
FIG. 9A and FIG. 9B illustrate upper and lower views of a dispensing mechanism for dispensing prefilled syringes and other similarly-shaped items, in accordance with embodiments of the invention.
Figure 9A:
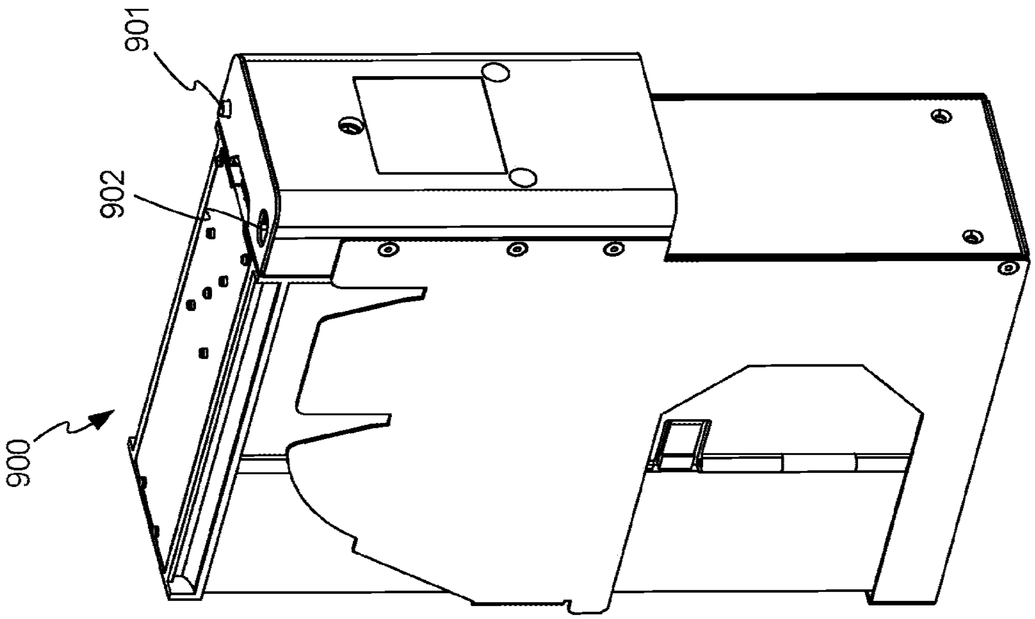

FIG. 9A and FIG. 9B illustrate upper and lower views of a dispensing mechanism 900 for dispensing prefilled syringes and other similarly-shaped items, in accordance with embodiments of the invention.

As is visible in FIG. 9A, a button 901 at the top of dispensing mechanism 900 allows a user authorized to access the interior of restock drawer 106 to signal computer 103, for example to record the fact that dispensing mechanism 900 has been refilled. A light 902 may be present to enable computer 103 to communicate to the user, for example flashing the light to direct the user to restock this particular dispensing mechanism.

As is visible in FIG. 9B, a connector 903, compatible with connectors 302 on rails 201, is positioned to engage one of connectors 302 when dispensing mechanism 900 is installed in restock drawer 106. Various parts of dispensing mechanism 900 collectively constitute a housing that defines an opening 904 at the bottom of dispensing mechanism 900, through which items are dispensed. Dispensing mechanism 900 may be removably secured to one of rails 201 using a snap mechanism, one or more screws, or by another method.

Figure 10B:
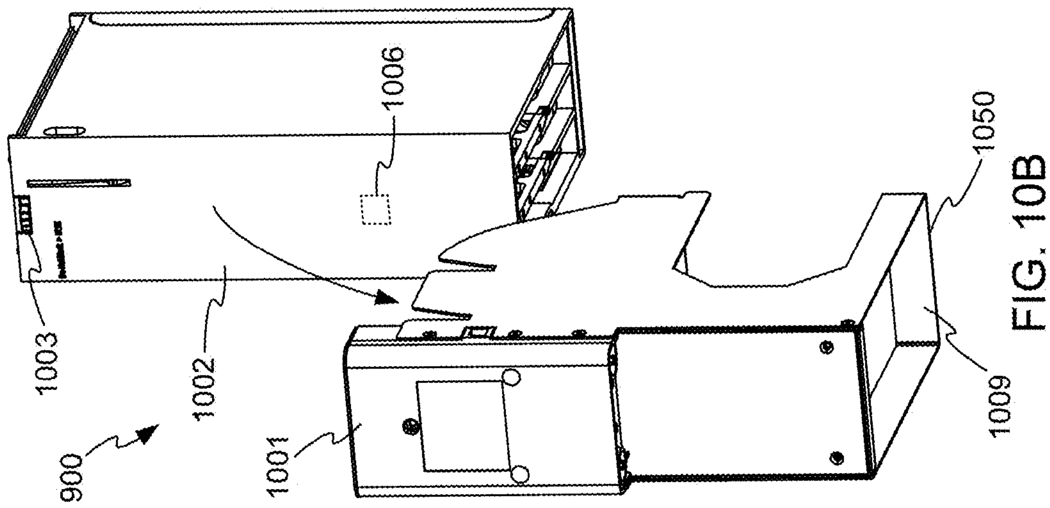
FIG. 10A and FIG. 10B illustrate partially exploded views of the dispensing mechanism of FIGS. 9A and 9B, showing the separation of a dispenser from a cassette.
Figure 10A:
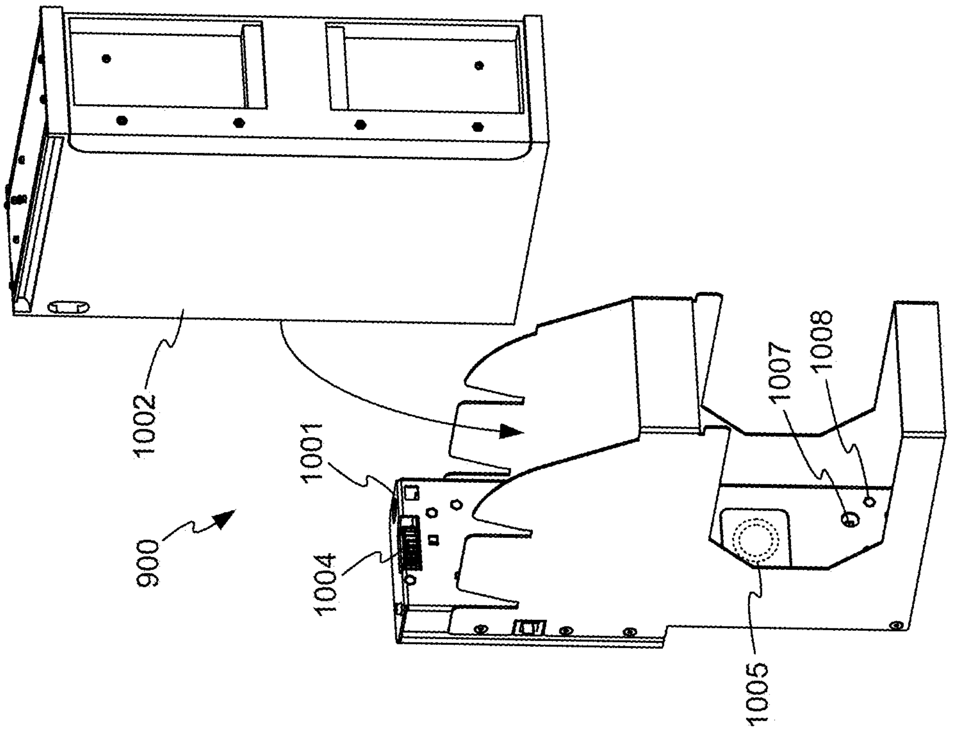

As is shown in FIG. 10A and FIG. 10B, example dispensing mechanism 900 comprises a dispenser 1001 and a cassette 1002, which are separable. For example, dispenser 1001 and cassette 1002 may snap together, may be separable with the removal of one or a small number of screws, or may be reasonably separable in some other way without damage to either dispenser 1001 or cassette 1002. In this way, restocking may be accomplished by replacing a depleted cassette 1002 with a full cassette 1002. A gear 1003 in cassette 1002 engages a driving gear 1004 within dispenser 1001 when cassette 1002 is assembled to dispenser 1001.

Preferably, as will be discussed in more detail below, cassette 1002 does not contain any active electrical components. All of the active components of example dispensing mechanism 900 may reside in dispenser 1001. For example, an antenna 1005 can excite a passive memory chip 1006 in cassette 1002, to determine the contents of cassette 1002 (written into passive memory chip 1006 when cassette 1002 was filled at a remote location). If desired, antenna 1005 can also be used to update the data in passive memory chip 1006. This wireless data exchange may use any suitable wireless protocol, for example Near Field Communications (NFC), radio frequency identification (RFID), or another wireless protocol.

Dispenser 1001 can preferably automatically detect the installation and removal of cassette 1002. This automatic detection may facilitate the inventory and tracking of items, and also can help prevent illicit diversion of items. The detection may be accomplished in any suitable way, for example periodic polling using antenna 1005, a contact sensor (not shown) that can detect the presence of cassette 1002 electromechanically, or by another technique.

In other embodiments, a dispensing mechanism in accordance with embodiments of the invention may not have the separable architecture of dispensing mechanism 900, but may be a single unit including space for storing items to be dispense and including an actuator and other components for dispensing items. In other embodiments that do include a cassette, the cassette may include active components, for example a motor or other actuator, light emitters for sensing, or other components.

As are visible in FIG. 10A, a light emitter 1007 and one or more light receivers 1008 are positioned near the bottom of dispenser 1001. In operation, light from light emitter 1007 reflects from reflective surface 1009 of far wall 1050 (visible in FIG. 10B) and returns to light receivers 1008, so long as it is not interrupted by an item being dispensed and falling through the "light curtain" formed across opening 904. When an item is dispensed through opening 904, it interrupts the light received by either or both of light receivers 1008, and dispenser 1001 can note that an item has in fact been dispensed. If no light interruption is detected despite a command to dispense an item, computer 103 may assume that a misfeed or other problem has occurred, or that cassette 1002 is empty. By using more sophisticated monitoring strategies, accidental dispensing of multiple items may be detected. For example, if two interruptions of the light curtain are detected closely spaced in time, a double feed may be indicated. Emitter 1007 may be of any suitable type of emitter, and may emit light in any suitable wavelength or combinations of wavelengths. For example, light emitter 1007 may be a light emitting diode, a laser such as a vertical cavity semiconductor emitting laser (VCSEL) or another kind of light source, and may emit visible light, infrared light, or light in other suitable wavelength bands or combinations of wavelength bands.

In other embodiments, light emitter 1007 and receivers 1008 may be on opposite sides of opening 904, so that receivers 1008 receive light directly from light emitter 1007 until the light is interrupted by the dispensing of an item.

Figure 11:
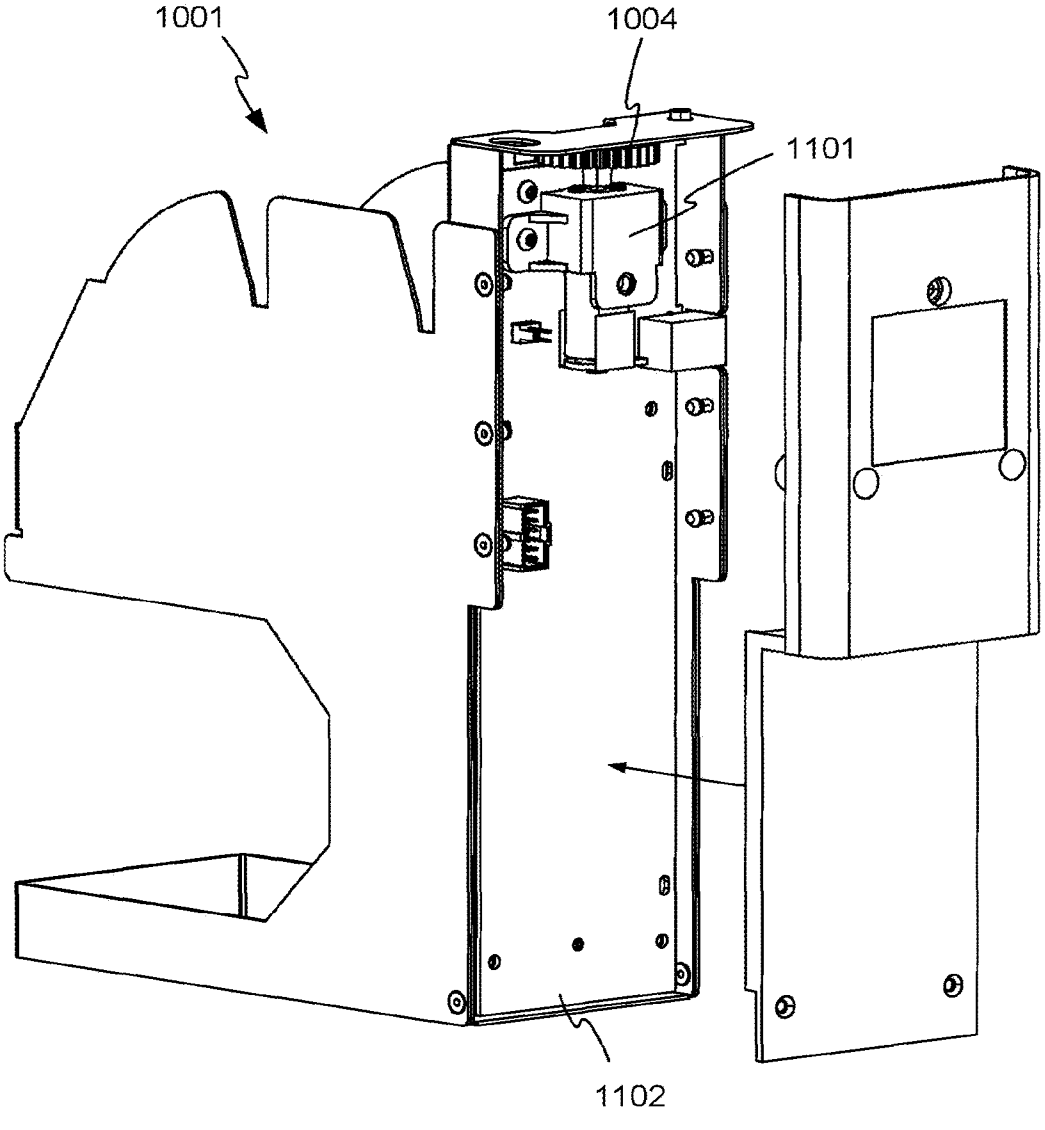
FIG. 11 shows a partially exploded oblique view of the dispenser of FIGS. 10A and 10B.

FIG. 11 shows a partially exploded oblique view of dispenser 1001, revealing some internal details of dispenser 1001. A motor 1101 is mounted on a printed circuit board 1102, and turns driving gear 1004, which engages gear 1003 on cassette 1002 to actuate cassette 1002. Motor 1101 may be, for example, a stepper motor whose angular position can be readily moved incrementally and held. In that case, an item may be dispensed by advancing motor 1101 by a number of steps known to correspond to one dispensing operation. If the light curtain does not detect that an item is dispensed, motor 1101 may be advanced further, and if no dispensing is yet detected, an error message may be generated, or it may be assumed that cassette 1002 is empty. Alternatively, motor 1101 may be a simple DC or AC motor, in which case dispensing may be accomplished by simply running motor 1101 until the dispensing of an item is detected, and then shutting off the motor so that motor 1101 is advanced incrementally as far as is needed. A time limit may be imposed, such that if no dispensing is detected within the time limit with motor 1101 running, the motor may be shut off and an error message generated. In other embodiments, an encoder may be provided on the motor or another component, and may provide feedback as to the rotational position of the motor or the state of the dispensing mechanism.

In other embodiments, an actuator other than a motor may be used. For example, a solenoid or memory metal actuator may provide a reciprocating motion that is used to drive the driving gear within dispenser 1001 using a ratchet or ratchet-like arrangement. Other kinds of actuators and driving arrangements are possible.

A microprocessor, microcontroller, or similar controlling circuitry may reside within dispenser 1001, and may operate the various active components and sensors of dispenser 1001 in response to high-level commands from a supervisory controller elsewhere within restock drawer 106, or from computer 103. In that case, dispenser 1001 is considered a "smart" dispenser, because it includes some processing intelligence. However, other architectures are possible. For example, logic signals from a supervisory controller elsewhere within restock drawer 106 may operate dispenser 1001.

As was discussed above, dispensing mechanism 900 may be especially useful for dispensing prefilled syringes, which preferably are enclosed in protective capsules such as capsule 801.

Figure 12:
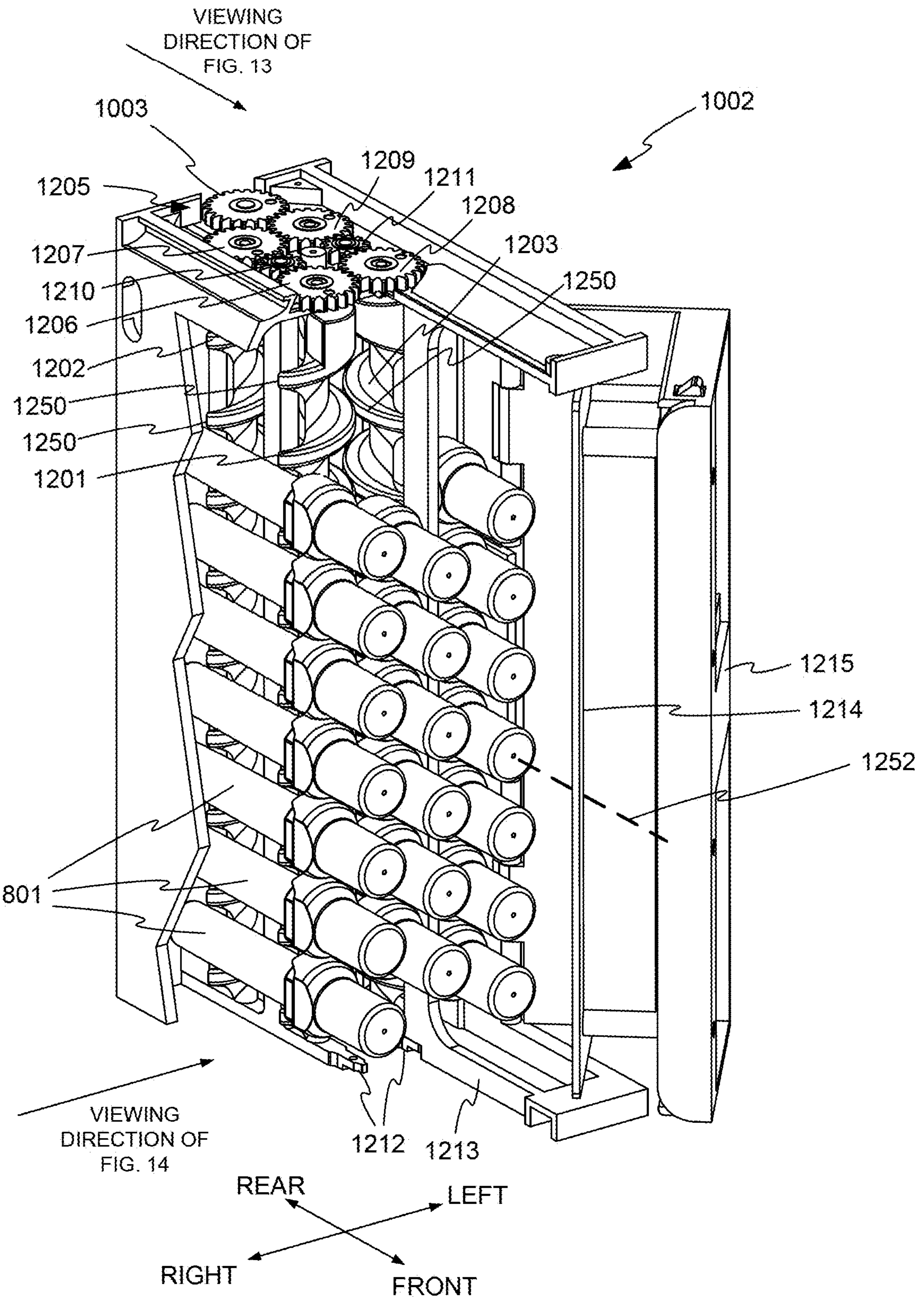
FIG. 12 shows an oblique view of the cassette of FIGS. 10A and 10B, partially cutaway.

FIG. 12 shows an oblique view of a cassette 1002 in accordance with embodiments of the invention, partially cutaway, to reveal a number of syringe capsules 801 stored inside. For visibility of the internal arrangement, cassette 1002 is shown only partially filled with syringe capsules 801. The capsules 801 shown in FIG. 12 hold 1 ml syringes 601. A removable spacer 1214 is attached to door 1215 of cassette 1002, to constrain the shorter capsules 801 longitudinally with the longitudinal axes 1252 of the items to be dispensed being generally perpendicular to the rotational axes of the at least two helical augers. When it is desired to dispense 2 ml syringes 602, spacer 1214 can be removed.

Cassette 1002 includes four augers in a parallel vertical arrangement. In FIG. 12 a right front auger 1201, a right rear auger 1202, and a left front auger 1203 are visible. A left rear auger 1204 is also present, but not visible in FIG. 12. Three vertical channels for storing three columns of capsules 801 are formed by one or more of the augers, cassette inserts 1212, and part dividers 1213 formed in the housing of cassette 1002. Capsules 801 are stored with their longitudinal axes generally perpendicular to the axes of A set of gears 1205 includes a right front auger gear 1206 fixed to right front auger 1201, such that right front auger 1201 turns when right front auger gear 1206 is turned. Similarly, right rear auger gear 1207 is fixed to right rear auger 1202, left front auger gear 1208 is fixed to left front auger 1203, and left rear auger gear 1209 is fixed to left rear auger 1204. Left rear auger gear 1209 is engaged with gear 1003 and left rear auger gear 1209. Right and left idler gears 1210 and 1211 couple to the respective front and rear auger gears. Thus, when gear 1003 is driven by driving gear 1004 of dispenser 1001, all four augers in cassette 1002 turn in synchronization, as is explained in more detail below, to move capsules 801 downward toward the bottom of cassette 1002.

It will be recognized that the terms "left", "right", "front", and "back" are arbitrarily assigned, and may be assigned differently in other embodiments. Similarly, the terms "up", "down", "top", "bottom", "vertical", "horizontal" and the like refer to the positions of the dispensing mechanisms in the figures. Dispensing mechanisms embodying the invention may be used in other orientations.

Figure 13:
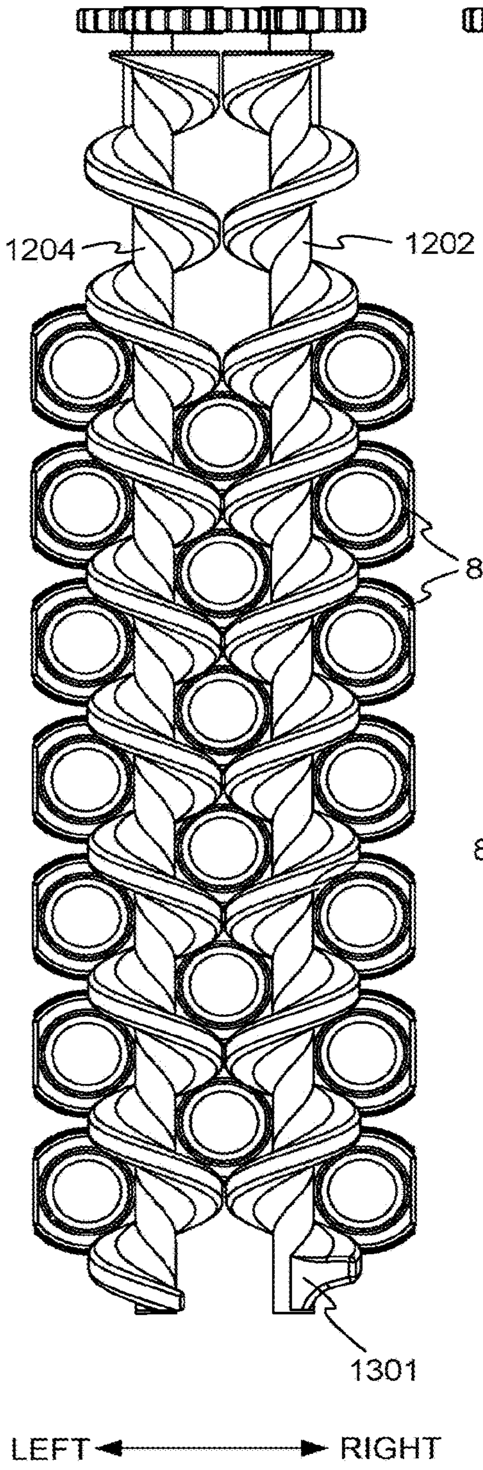
FIG. 13 and FIG. 14 show orthogonal views of augers, gears, and capsules of the cassette of FIGS. 10A and 10B, in accordance with embodiments of the invention.
Figure 14:
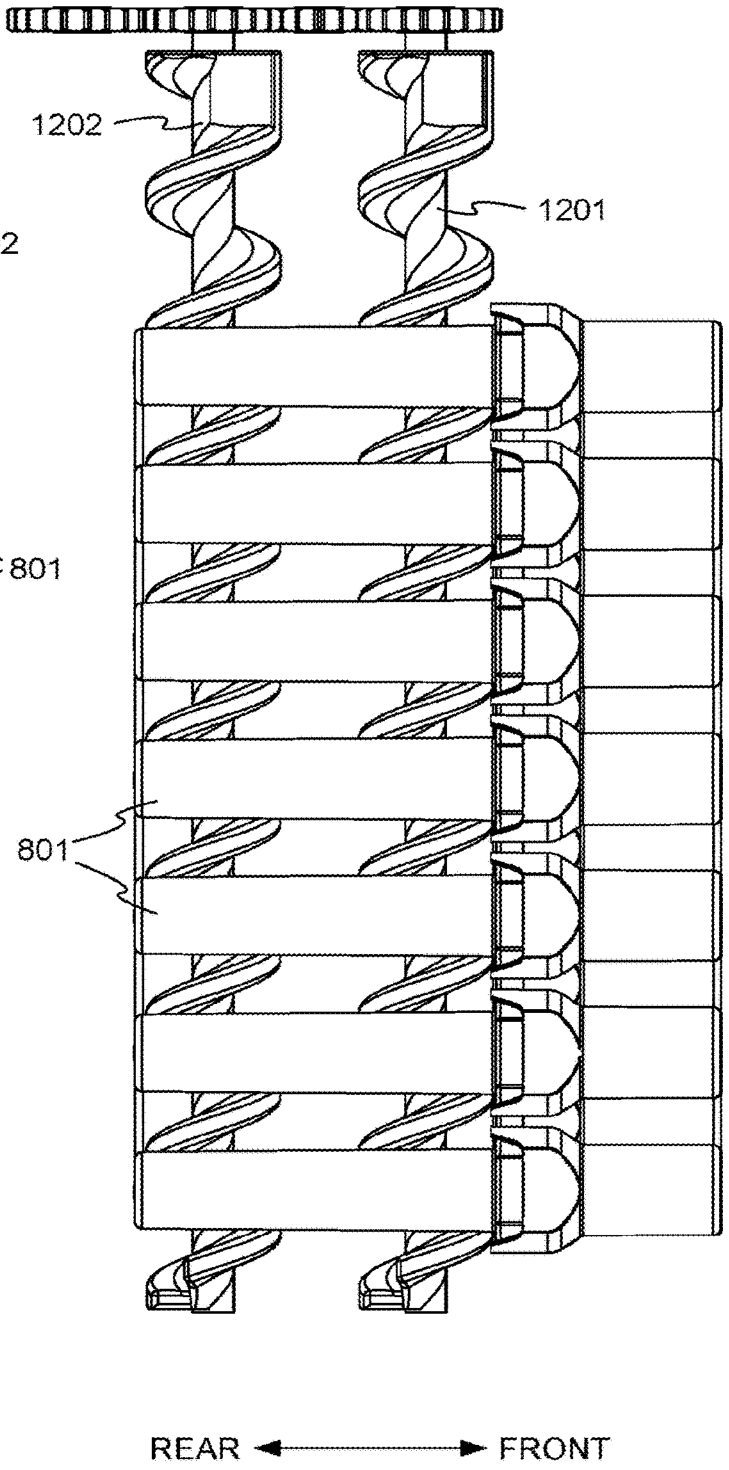

FIG. 13 and FIG. 14 show orthogonal views of the augers, gears, and capsules of cassette 1002, from the directions indicated in FIG. 12. Right rear auger 1202 and left rear auger 1204 are visible in FIG. 13, while the front augers are not. Right rear auger 1202 and right front auger 1201 are visible in FIG. 14, while the left augers are not.

As is shown in FIG. 13, the left and right augers have different handedness. Left rear auger 1204 has left handed threads, while right rear auger 1203 has right handed threads 1250. However, as is shown in FIG. 14, right front auger 1201 and right rear auger 1202 have right handed threads 1250.

Figure 15:
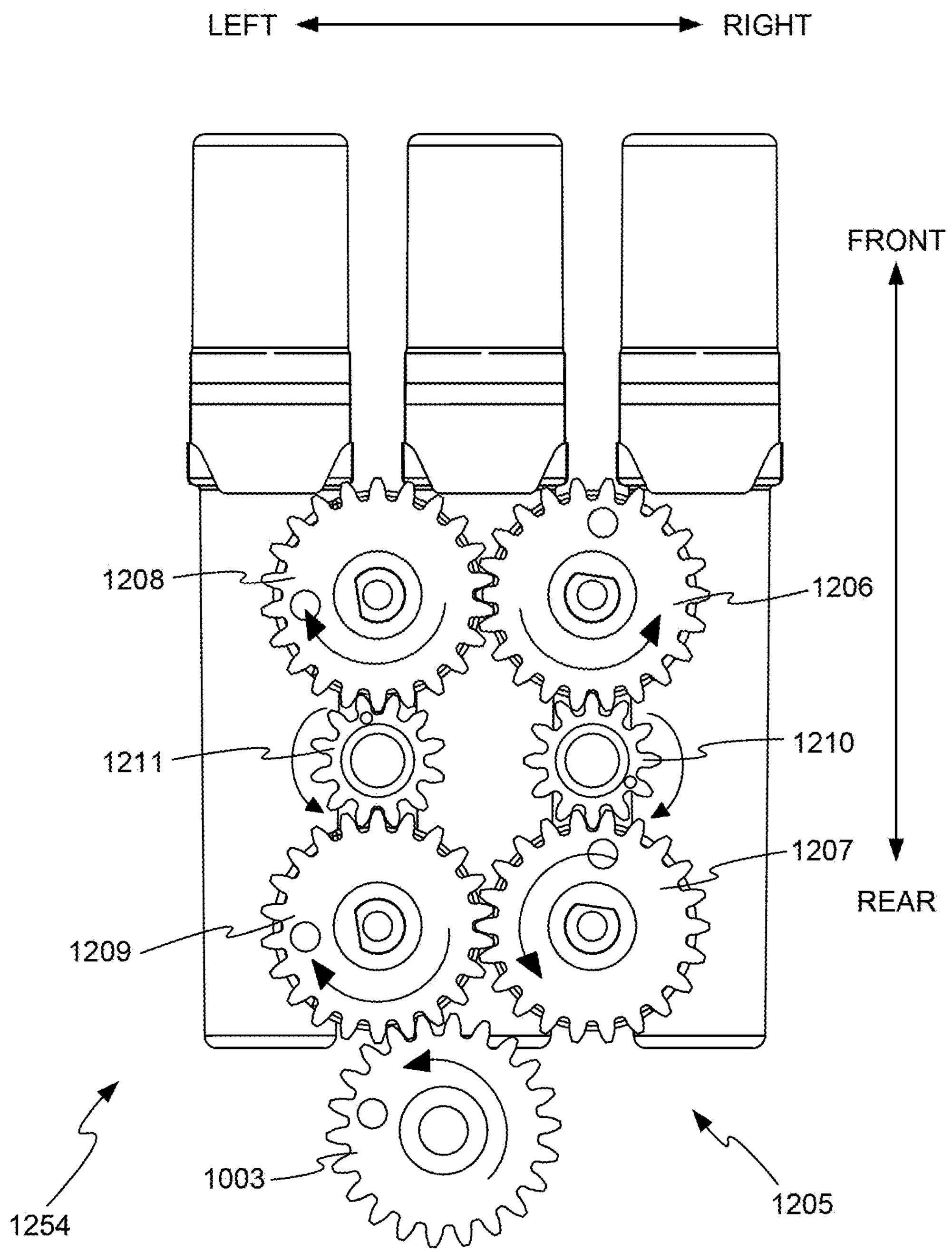
FIG. 15 shows the operation of a set of gears of the cassette of FIGS. 10A and 10B, in accordance with embodiments of the invention.

FIG. 15 shows the operation of gears 1205 forming a driving mechanism 1254. When gear 1003 is driven counterclockwise (as viewed from the top of cassette 1002) by driving gear 1004 and motor 1101, left rear auger gear 1209 and left rear auger 1204 are driven clockwise. And because left rear auger gear 1209 engages with right rear auger gear 1207, right rear auger gear and right rear auger 1202 turn counterclockwise. Because left rear auger 1204 has left handed threads (as shown in FIG. 13), turning it clockwise drives capsules 801 downward. And because right rear auger 1202 has right handed threads, turning it counterclockwise also drives capsules 801 downward.

Right and left idler gears 1210 and 1211 translate the rotation of rear auger gears 1207 and 1209 to front auger gears 1206 and 1208, ensuring that the augers on the right side of cassette 1002 (augers 1201 and 1202) turn in the same direction, and the augers on the left side of cassette 1002 (augers 1203 and 1204) also turn in the same direction, but opposite the direction of the augers on the other side. Because the handedness of the augers on the two sides of cassette 1002 differs and the rotation direction differs, both sets of augers drive capsules 801 downward.

It will be understood that the direction of rotation of gear 1003 could be reversed, and the handedness of all of the augers reversed, to achieve the same effect.

Referring again to FIG. 13, the three columns of capsules 801 thus progress downwardly in parallel and at the same rate. The flat faces 1301 at the bottom thread of the left and right augers are out of phase, so that a passage is formed, permitting a capsule 801 to drop by gravity from one of the columns out of cassette 1002 at intervals of 90, 90, and 180 degrees of the rotation of gear 1003. In other embodiments, a dispensing mechanism embodying the invention may be used in another orientation, such that the augers force the items from the cassette.

Figure 16:
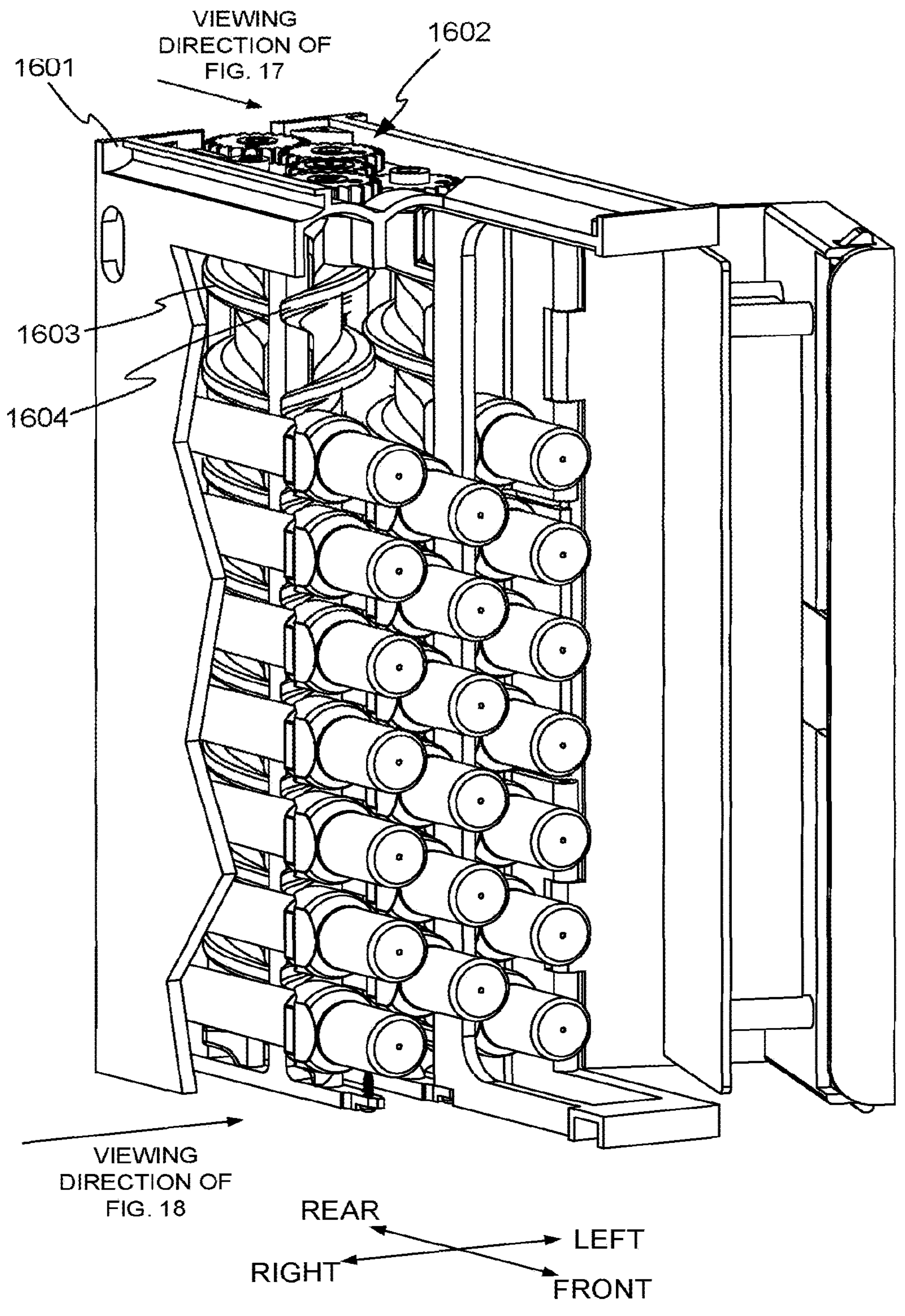
FIG. 16 shows an oblique view of a cassette in accordance with other embodiments of the invention, partially cutaway.

FIG. 16 shows an oblique view of a cassette 1601 in accordance with other embodiments of the invention, partially cutaway to reveal a number of syringe capsules 801 stored inside. As compared with cassette 1002, cassette 1601 has the same external dimensions, but uses different augers and gears to accomplish the downward motion of the capsules 801 inside. For example, as is visible in FIG. 16, gear set 1602 differs from gear set 1205 shown in FIG. 12. In addition right rear auger 1603 has a different handedness than right front auger 1604, as is explained in more detail below.

Figure 17:
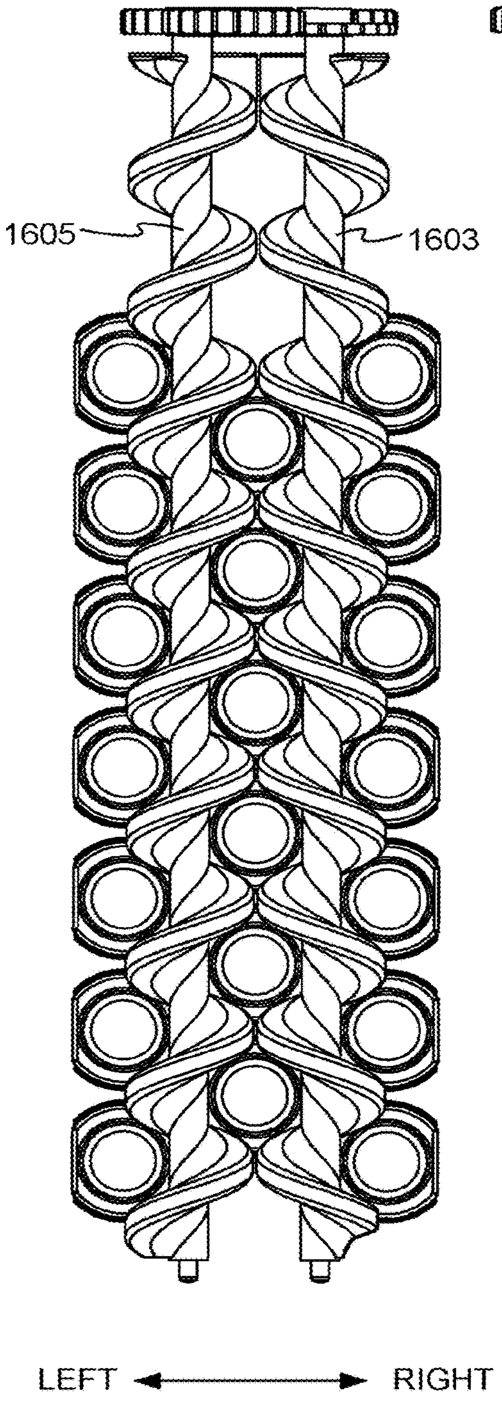
FIG. 17 and FIG. 18 show orthogonal views of augers, gears, and capsules of the cassette of FIG. 16, in accordance with embodiments of the invention.
Figure 18:
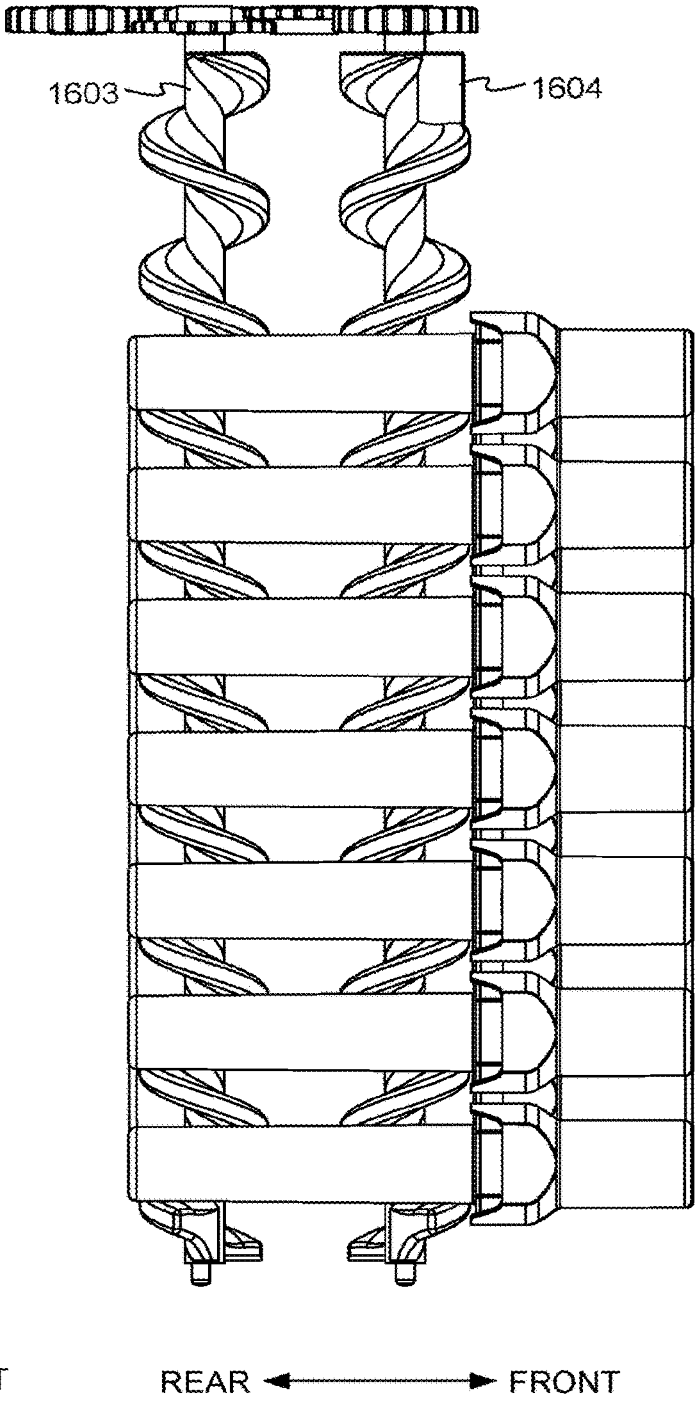

FIG. 17 and FIG. 18 show orthogonal views of the augers, gears, and capsules of cassette 1601, from the directions indicated in FIG. 16. Right rear auger 1603 and left rear auger 1605 are visible in FIG. 17, while the front augers are not. Right rear auger 1603 and right front auger 1604 are visible in FIG. 18, while the left augers are not.

As is shown in FIG. 17, the left and right rear augers have different handedness. Left rear auger 1605 has right handed threads, while right rear auger 1603 has left handed threads. Also, as is shown in FIG. 18, right front auger 1604 also has right handed threads, differing from right rear auger 1603. Although not visible, the left front auger also has left handed threads, so that opposing corner augers have like threads.

Figure 19:
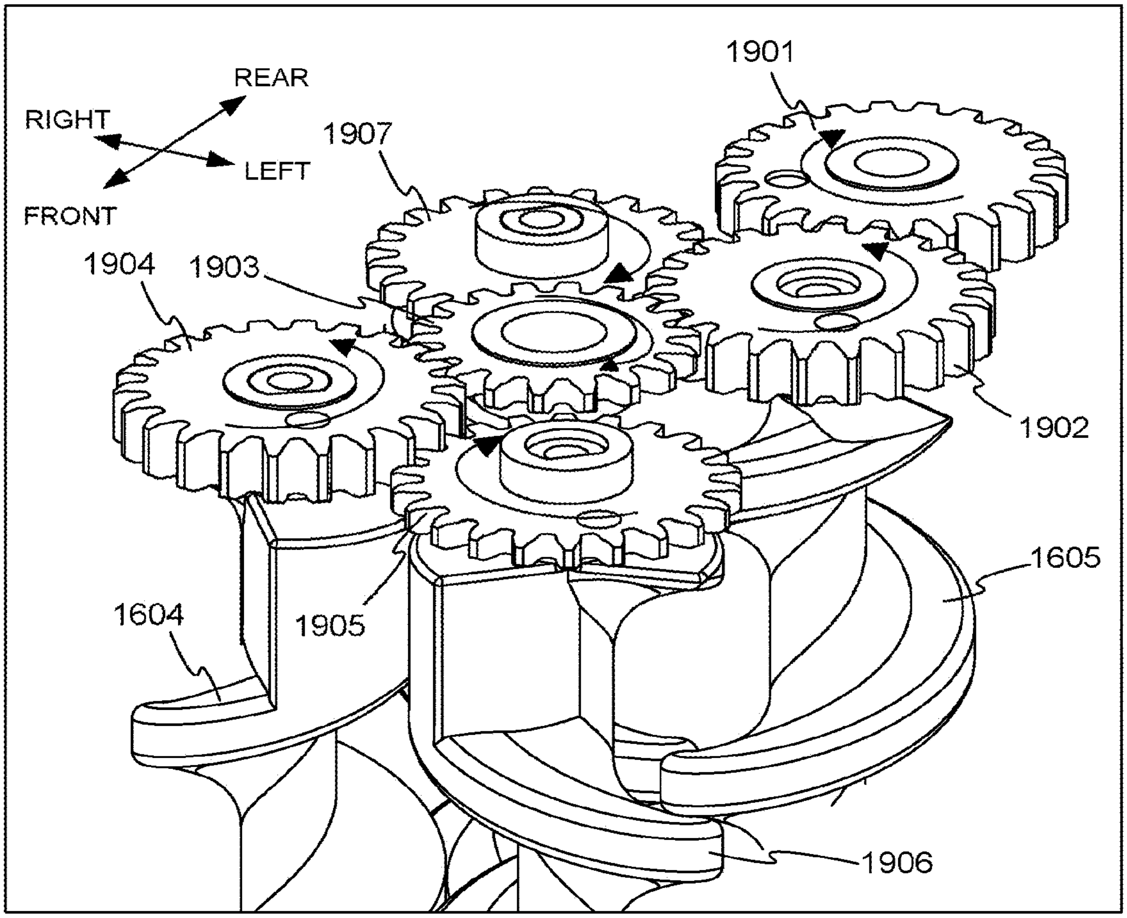
FIG. 19 shows the operation of the gears of FIGS. 17 and 18 in more detail.

Augers with the handedness arrangement of FIGS. 17 and 18 work in concert with gears 1602, as shown in more detail in FIG. 19. Gear 1901 is similar to gear 1003, and is positioned to be driven by gear 1004 of dispenser 1001. Gear 1901 engages with left rear auger gear 1902, which is coupled with left rear auger 1605, which has right handed threads. When gear 1901 is turned clockwise (as viewed from above) as shown, left rear auger 1605 turns counterclockwise.

Left rear auger gear 1902 is coupled to central idler gear 1903, which in turn drives right front auger gear 1904, turning right front auger 1604 in the same direction as left rear auger 1605. Because diagonal augers have the same handedness in this embodiment, they both drive any capsules 801 downward.

Left front auger gear 1905 engages and is driven by right front auger gear 1904, and thus turns in the opposite direction. Left front auger 1906 thus turns clockwise, and having left handed threads, drives capsules 801 downward.

Similarly, right rear auger gear 1907 engages and is driven by left rear auger gear 1902, and turns the same direction as diagonally-opposed left front auger 1906. Idler gear 1903 has teeth only in the upper portion of its height, and auger gears 1905 and 1907 have teeth only in the lower portion of their heights, so that they do not interfere with idler gear 1903.

In the embodiment of FIGS. 16-19, syringes are also dispensed at intervals of 90, 90, and 180 degrees of the rotation of gear 1901. Unitary dispensing may be accomplished in any suitable way. For example, motor 1101 may be a stepper motor, and may be driven by the number of steps needed to turn the augers 90 or 180 degrees, as needed for the next dispensing. Or motor 1101 may be driven until the dispensing of a syringe is detected by the light curtain at the bottom of dispenser 1001.

In other embodiments, a component of a cassette in accordance with embodiments of the invention may be fitted with an encoder, so that the positions of the augers are known.

Figure 20:
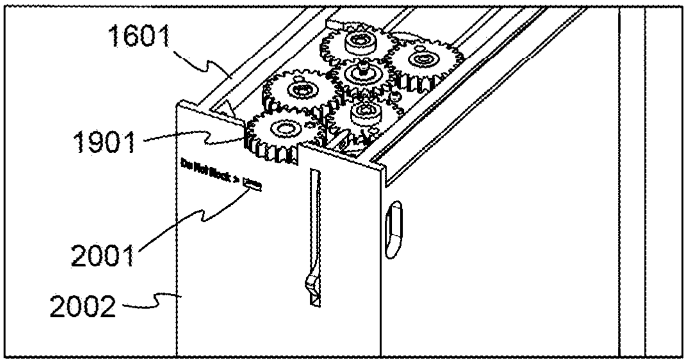
FIG. 20, FIG. 21, and FIG. 22 illustrate the operation of one example kind of encoder, in accordance with embodiments of the invention.
Figure 21:
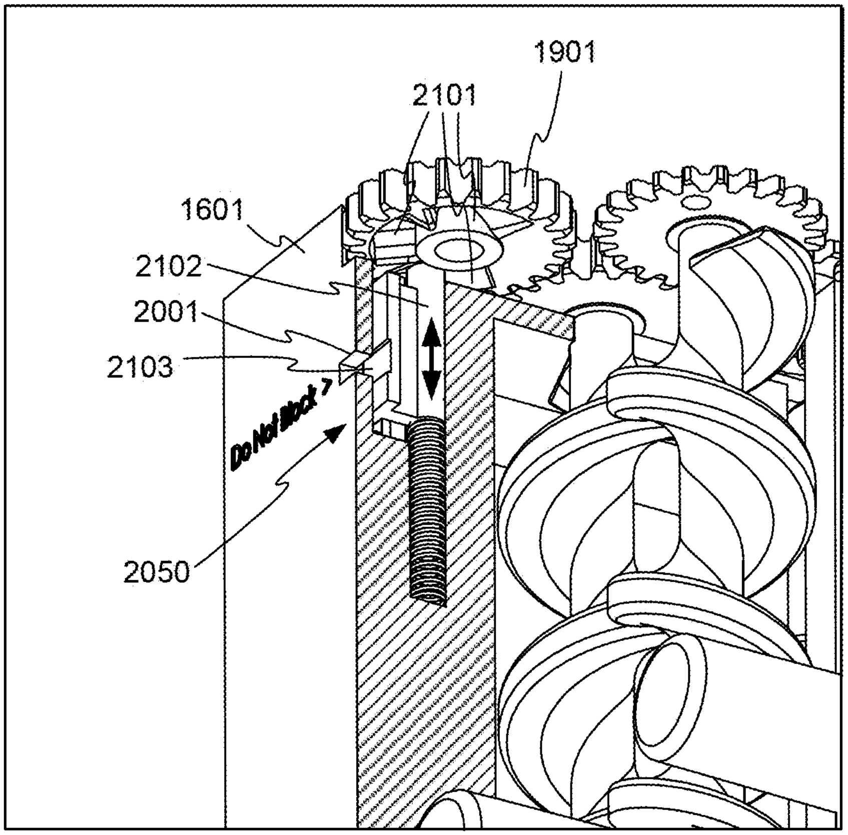
Figure 22:
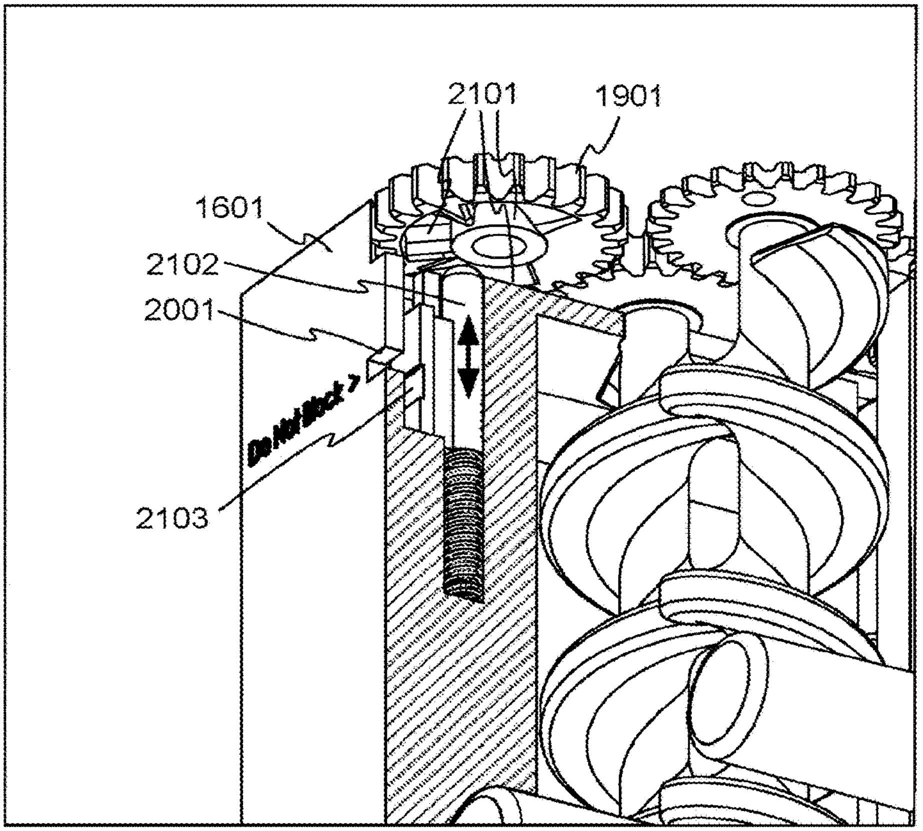

FIG. 20, FIG. 21, and FIG. 22 illustrate the operation of one example kind of encoder 2050 (shown in FIG. 21), in accordance with embodiments of the invention. FIG. 20 shows an upper oblique rear view of a portion of cassette 1601. An opening 2001 is formed in rear wall 2002 of cassette 1601. Rear wall 2002 is the wall that mates with dispenser 1001 when cassette 1601 is coupled with dispenser 1001. Opening 2001 is just below gear 1901. An optical sensor (not shown) may be present in dispenser 1001, aligned with opening 2001.

FIG. 21 shows a lower oblique rear view of a portion of cassette 1601. Gear 1901 has a number of ramped pockets 2101 in its underside. In this example, pockets 2101 are rotationally spaced, 90, 90, and 180 degrees apart, and correspond to positions of gear 1901 at which items are dispensed from cassette 1601. A spring-loaded plunger 2102 rides against the bottom side of gear 1901, "falling" (upward) into pockets 2101 as they pass plunger 2102. Plunger 2102 carries a reflective target 2103, but the part of plunger 2102 surrounding target 2103 is otherwise relatively non-reflective, for example molded of a black plastic. Whenever plunger 2102 falls into one of pockets 2101, target 2103 becomes visible through opening 2001.

FIG. 21 shows plunger 2102 in its upward position, such that target 2103 is visible through opening 2001. FIG. 22 shows plunger 2102 in its downward position, such that target 2103 is not visible through opening 2001.

A light source and sensor within dispenser 1001 (not shown) can detect target 2103, to detect when cassette 1601 has reached a position in which a syringe can be dispensed. When gear 1901 is not in such a position, plunger 2102 is pushed downward by the ramps at the trailing edges of pockets 2101, so that reflective target 2103 is no longer visible through opening 2001. The sensor reading the position of target 2103 thus provides feedback as to the configuration of cassette 1601. To dispense a syringe item, motor 1101 may be driven until target 2103 is seen by dispenser 1001, and then motor 1101 may be stopped. The dispensing of a syringe may be confirmed by signals from the light curtain at the bottom of cassette 1601. If not dispensed item is detected by the light curtain, gear 1901 may be advanced to the next dispensing position.

It will be recognized that other kinds of encoders may be used, for example rotary optical encoders, linear encoders, or other kinds of encoders, on any suitable component of a dispensing mechanism. In the type of encoder of FIGS. 21 and 22, the sense of the detections may be reversed. For example, a reflective target may be detectable when the mechanism is not at a dispensing location.

While the encoder arrangement is described in relation to cassette 1601, it may be used in other cassette arrangements as well, for example in cassette 1002.

In some embodiments, a cassette such as cassette 1601 may include a brake that is automatically engaged when the cassette is removed from its dispenser. In this way, inadvertent loss of items from the cassette may be prevented during transport and storage of the cassette.

Figure 23:
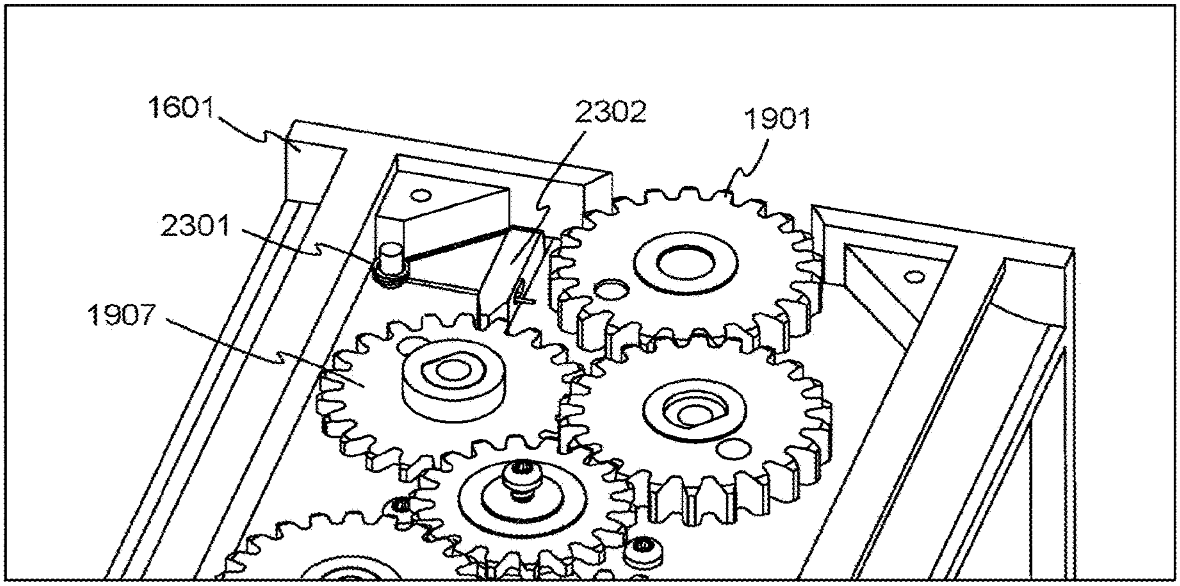
FIG. 23, FIG. 24, and FIG. 25 illustrate the operation of one example kind of brake, in accordance with embodiments of the invention.

FIG. 23 shows an upper oblique view of cassette 1601, including a braking arrangement according to embodiments of the invention. In this example arrangement, a torsion spring 2301 biases a wedge 2302 into the teeth of right rear auger gear 1907. So long as cassette 1601 is not attached to a dispenser, wedge 2302 prevents motion of the gears of cassette 1601.

Figure 24:
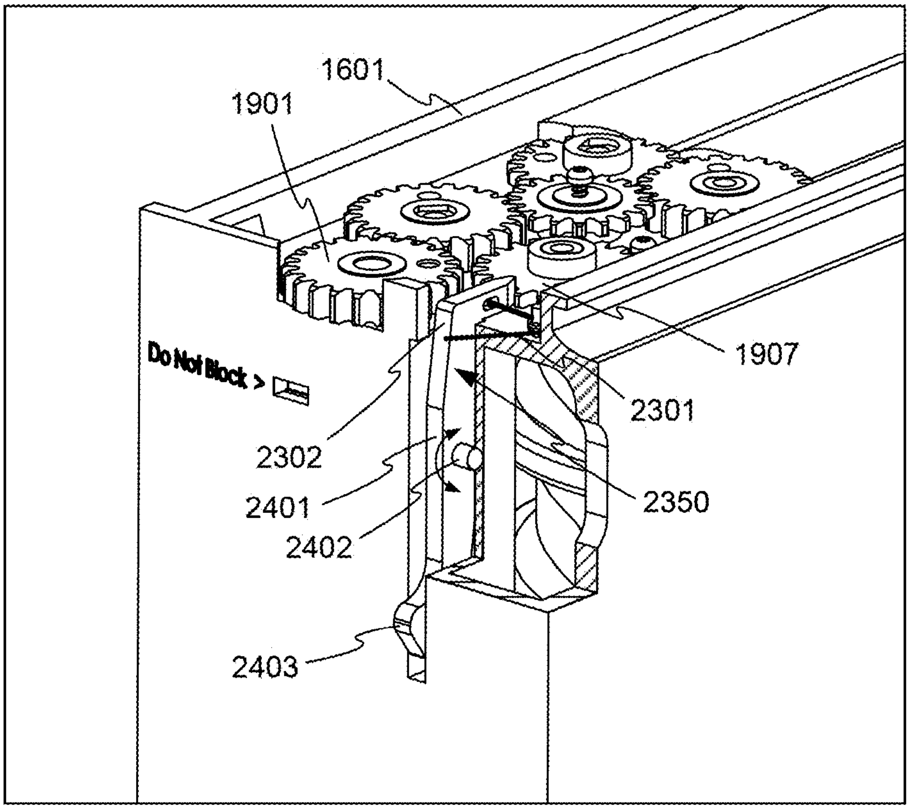

FIG. 24 shows a partially cutaway view of cassette 1601, revealing additional details of the brake 2350. Wedge 2301 is integrally formed with a lever 2401, which can pivot about axle 2402. At the bottom of lever 2401 is a protrusion 2403, which extends outside the envelope of cassette 1601 when wedge 2302 is engaged with gear 1907, by the action of torsion spring 2301.

Figure 25:
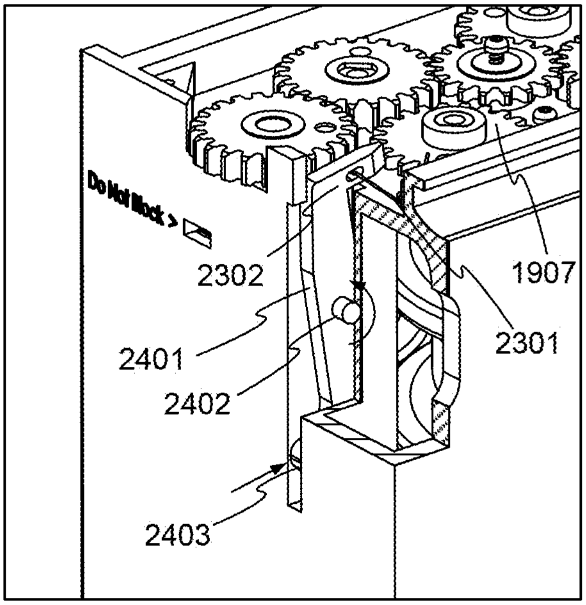

FIG. 25 shows a partially cutaway view of cassette 1601, with lever 2401 in a position as if cassette 1601 were engaged with a dispenser such as dispenser 1001 (not shown). The front wall of the dispenser has pushed protrusion 2403 of lever 2401 into cassette 1601, causing lever 2401 to rotate about axle 2402, drawing wedge 2302 out of engagement with gear 1907, against the action of torsion spring 2301. Thus, once cassette 1601 is installed in the dispenser, the gears are free to turn in response to motor 1101 (not shown). When cassette 1601 is disengaged from the dispenser, the gears of cassette 1601 are automatically locked.

It will be understood that the encoder and braking systems of FIGS. 23-25 may be used in cassettes of other embodiments, for example cassette 1002. In addition, other kinds of encoder and braking systems may be used.

Figure 26:
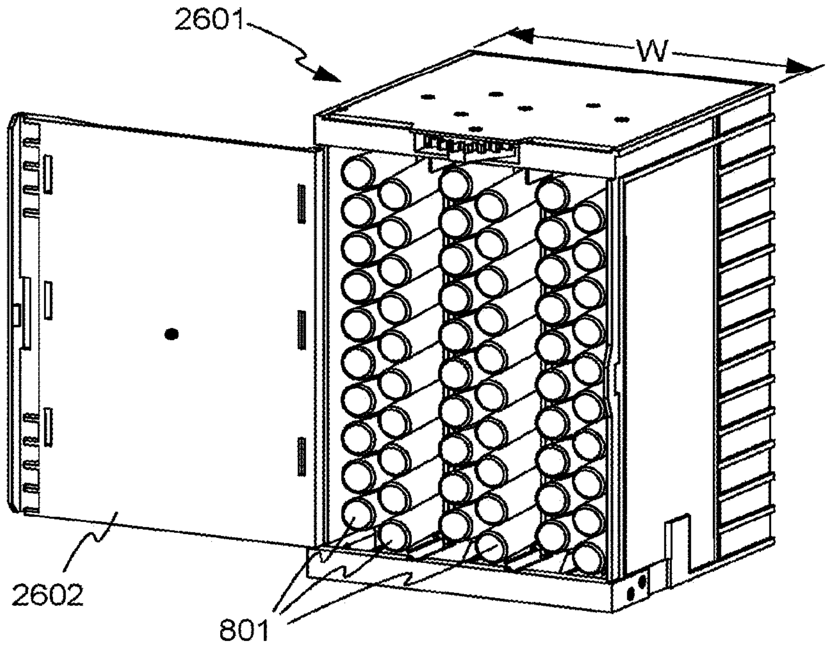
FIG. 26 shows a cassette in accordance with other embodiments of the invention.

FIG. 26 shows a cassette 2601 in accordance with other embodiments of the invention. The width W of cassette 2601 is approximately double the width of cassettes 1002 and 1602, but cassette 2601 may be of comparable size in the other orthogonal dimensions. Cassette 2601 can hold six columns of syringe capsules 801, and thus has a higher capacity than the other cassette embodiments described above. In FIG. 26, cassette 2601 is shown loaded with capsules for 2 ml syringes 602. A spacer (not shown) may be mounted to door 2602 when it is desired to use cassette 2601 to dispense 1 ml syringes 601, similar to spacer 1214 shown in FIG. 12.

Figure 27:
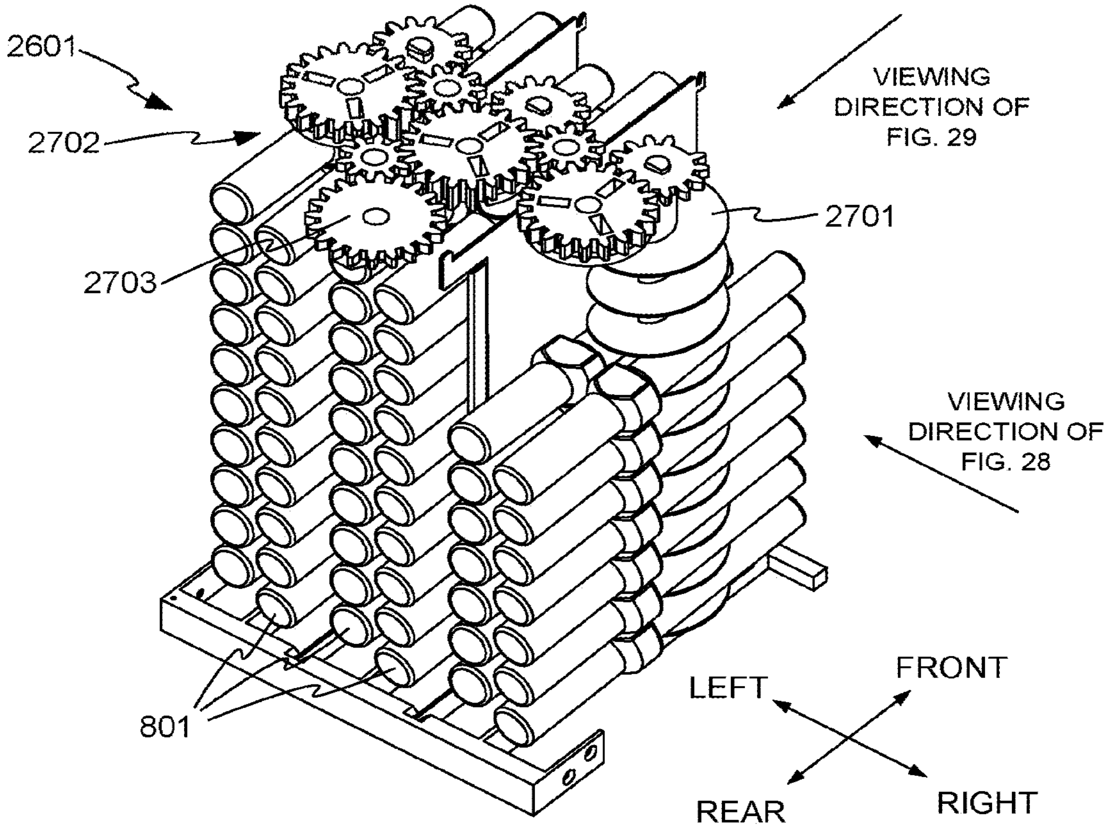
FIG. 27 shows the cassette of FIG. 26 with some enclosure parts removed.

FIG. 27 shows cassette 2601 with some enclosure parts removed, to reveal internal details. Three augers 2701 (only one of which is visible in FIG. 27) hold capsules in columns. Each of augers 2701 is preferably wide enough to substantially span two columns of capsules, one column on each side of each auger. A set of gears 2702 is positioned to be engaged by a driving gear in an attached dispenser (not shown), through drive and encoder gear 2703.

Figure 29:
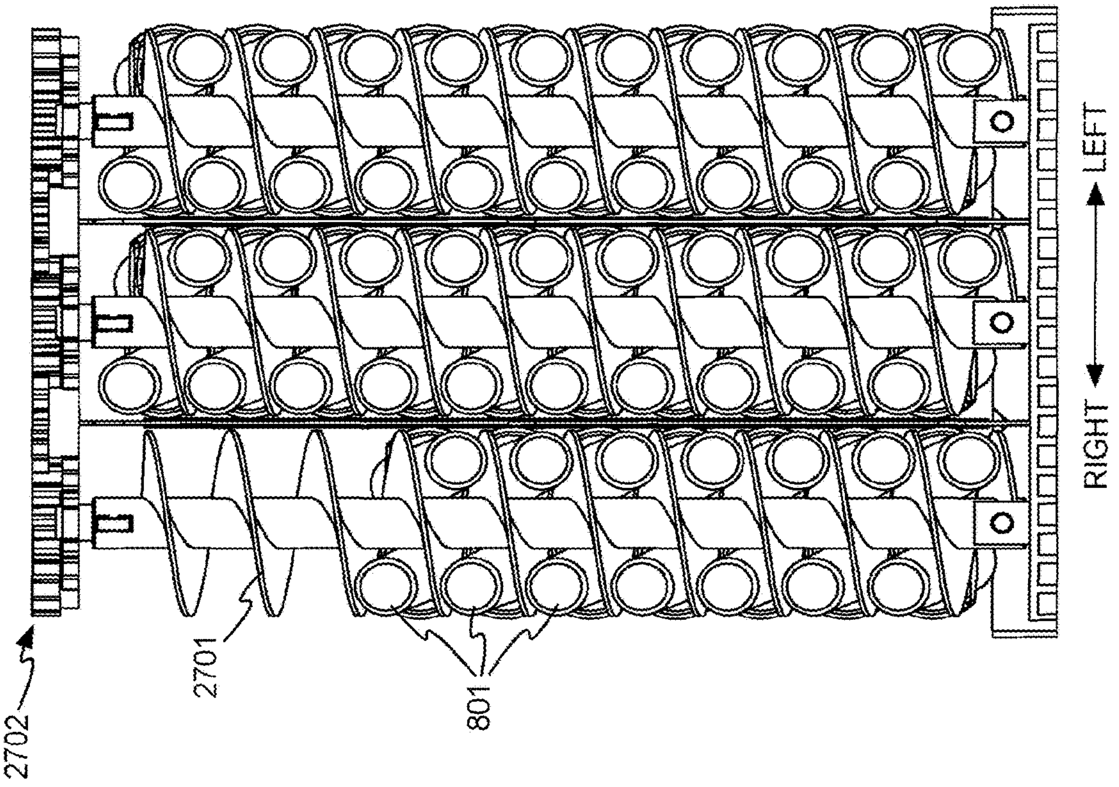
FIG. 28 and FIG. 29 show side and end views of the cassette of FIG. 26 respectively.
Figure 28:
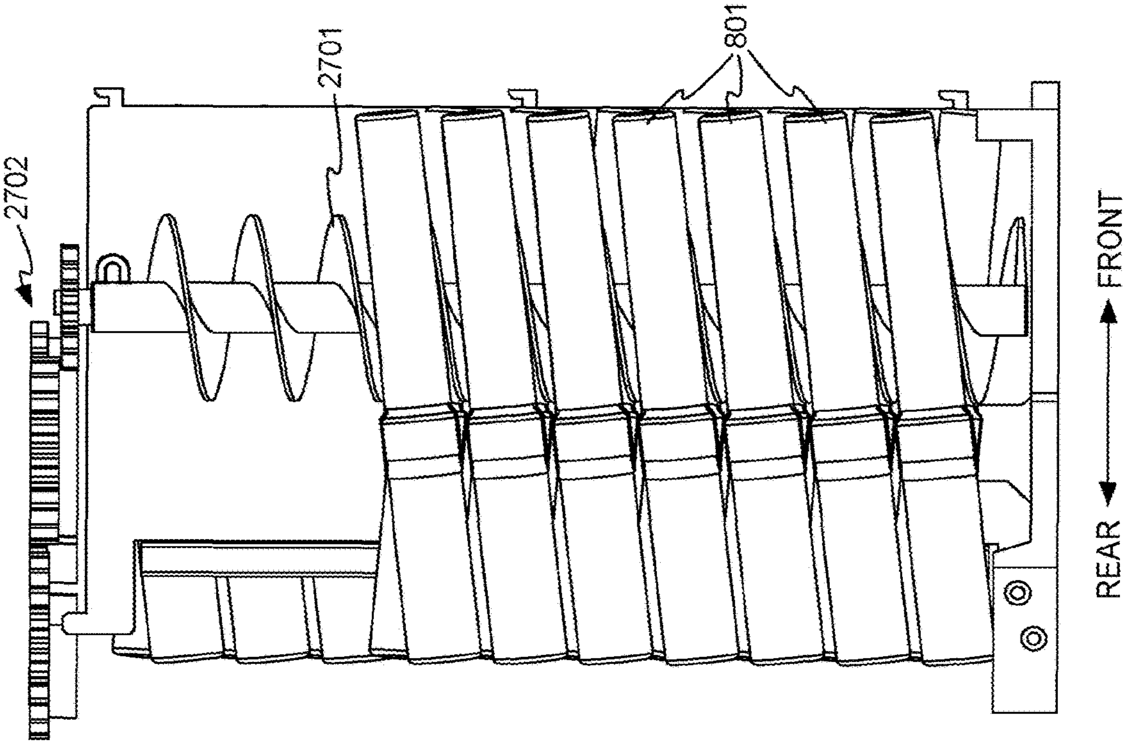

FIG. 28 and FIG. 29 show side and end views of cassette 2601 respectively, and illustrate the packing of syringe capsules 801 within augers 2701 of cassette 2601. Note that the left and right sides of cassette 2601 are defined as viewed from the rear, as in FIG. 27. Because cassette 2601 is viewed from the front in FIG. 29, left and right appear to be reversed in FIG. 29. Augers 2701 all have the same handedness (left or right handed threads), and are mounted "in phase" with each other. In some embodiments, all of augers 2701 are identical with each other.

Gears 2702 are designed such that as gear 2703 is turned, the augers 2701 "take turns" rotating intermittently to dispense syringes, as is explained in more detail below.

Figure 30:
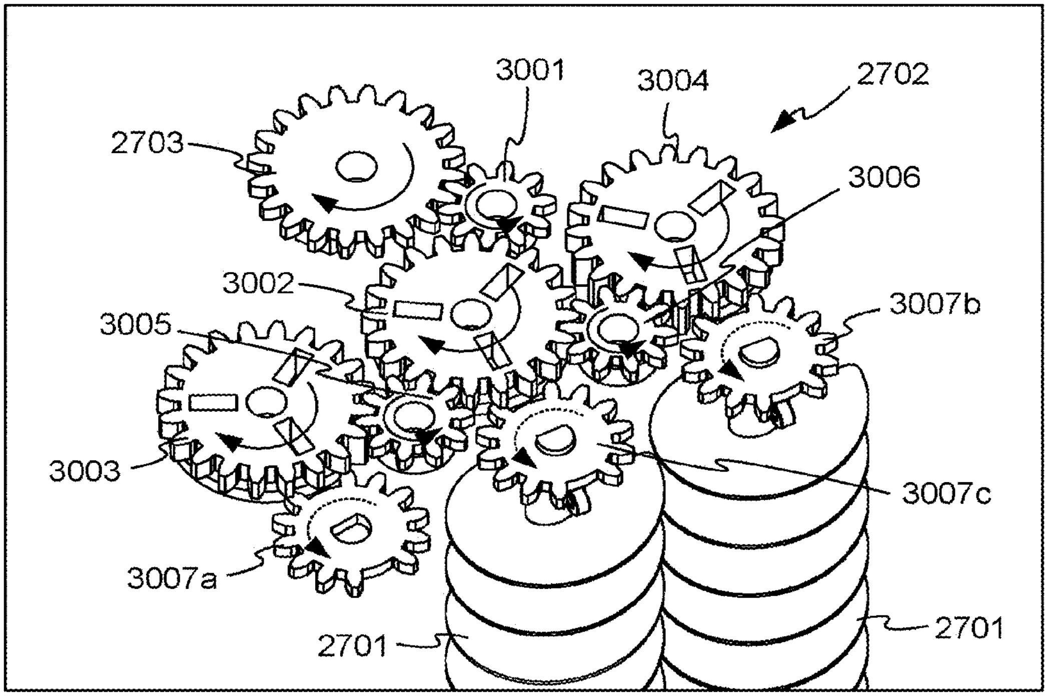
FIG. 30 is an upper oblique view of a set of gears of the cassette of FIG. 26.

FIG. 30 is an upper oblique view of gears 2702, including drive and encoder gear 2703. Two of augers 2701 are also shown, but one has been removed for clarity. A first idler gear 3001 engages with drive and encoder gear 2703, and also engages with a first timing gear 3002. In this example, first timing gear 3002 has the same pitch diameter and same number of teeth as drive and encoder gear 2703, and thus first timing gear 3002 turns by the same amount and in the same direction as drive and encoder gear 2703. Similarly, additional timing gears 3003 and 3004 are driven from first timing gear 3002, through additional idler gears 3005 and 3006. All of drive and encoder gear 703, idler gears 3001, 3005, and 3006, and timing gears 3002, 3003, and 3004 are thus geared together and turn together when drive and encoder gear 2703 is turned.

Each auger 2701 is fixed to a respective auger gear 3007*a*, 3007*b*, or 3007*c*, each corresponding to one of timing gears 3002, 3003, or 3004.

Figure 31:
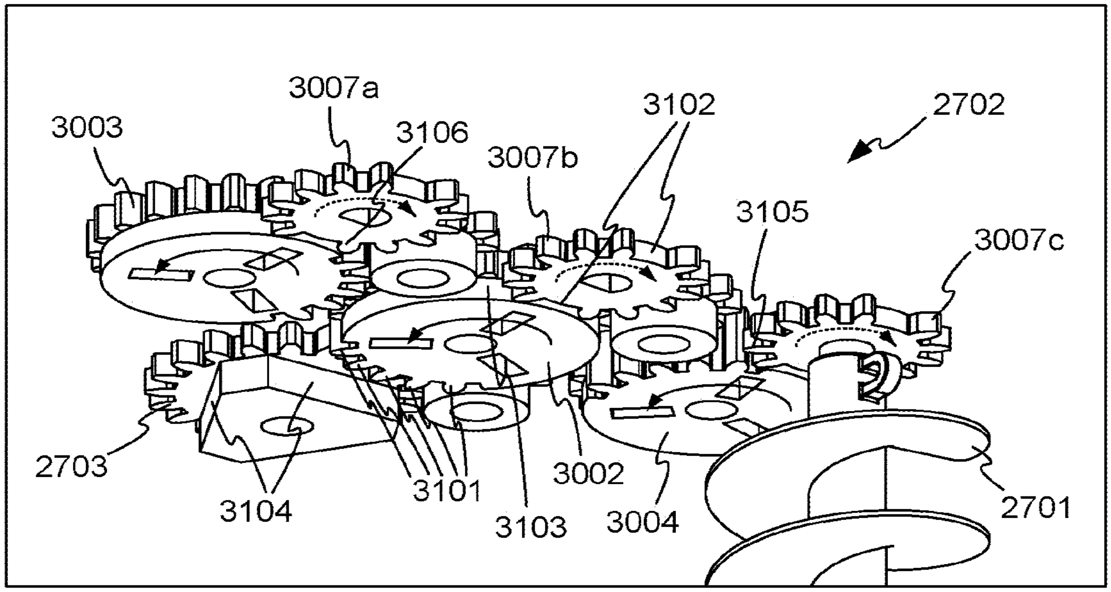
FIG. 31 is a lower oblique view of the gears of FIG. 30.

FIG. 31 is a lower oblique view of gears 2702, and showing the operation of auger gears 3007*a*, 3007*b*, and 3007*c*, in accordance with embodiments of the invention. Only one auger 2701 is shown in FIG. 31, for clarity.

As is visible in FIGS. 30 and 31, timing gears 3002, 3003, and 3004 have teeth around their entire perimeters only in the upper portion of their heights. In their lower portions, timing gears 3002, 3003, and 3004 have teeth around only a portion of their perimeters. For example, timing gear 3002 has 20 teeth around its upper portion, but only five teeth 3101 partially around its lower portion, and gaps between and adjacent the five teeth, for a total of six gaps. The remainder of the lower portion of timing gear 3002 is a smooth cylindrical surface 3103, preferably having a diameter of approximately the pitch diameter of timing gear 3002.

In addition, auger gear 3007*b* (corresponding to timing gear 3002) has a pitch diameter sufficient for 14 teeth, but has only 12 teeth, with two teeth missing at locations 3102, spaced 180 degrees apart around the perimeter of auger gear 3007*b*. In the position shown, auger gear 3007*b* does not turn with timing gear 3002, because their teeth are not engaged. Only when the lower teeth 3101 of timing gear 3002 reach the location of auger gear 3007*b* do the teeth of auger gear 3007*b* and timing gear 3002 engage. However, the engagement is temporary. Lower teeth 3101 will cause auger gear 3007*b* to rotate only 180 degrees, and then the two gears will disengage for the rest of the rotation of timing gear 3002.

Similar relationships exist between timing gear 3003 and auger gear 3007, and between timing gear 3004 and auger gear 3007*c*. Timing gears 3002, 3003, and 3004 are mounted out of phase with each other by 120 degrees. Thus, for every 120 degrees of rotation of drive and encoder gear 2703 (and of timing gears 3002-3004), one and only one of auger gears 3007*a*-3007*c* rotates 180 degrees. Auger gears 3007*a*-3007*c* "take turns" rotating 180 degrees. That is, the augers turn incrementally (pausing between rotations) and sequentially (one after the other, no two at the same time). Each 180 degree rotation of an auger dispenses one syringe. In FIGS. 30 and 31, the rotation directions of the augers are shown in dashed lines, to indicate the incremental motion.

As is visible in FIG. 31, auger gear 3007*c* is finishing its 180 degree rotation, and its teeth are just coming out of engagement with timing gear 3004 at location 3105. But at the other side of the gear set, timing gear 3003 is just coming into engagement with auger gear 3007*a* at location 3106, and auger gear 3007*a* is about to start its 180 degree rotation. Auger gear 3007*b* remains stationary for the time being as one of its missing teeth is adjacent smooth cylindrical surface 3103 of timing gear 3002.

Drive and encoder gear 2703 may include flat encoder faces 3104, angled at 120 degrees to each other. Encoder faces 3104 may be coated with a reflective material, and may be visible to a detector within a dispenser such as dispenser 1001. Whenever one of encoder faces 3104 is seen by the detector, it can be assumed that the currently moving auger has rotated 180 degrees, and that an item has been dispensed. To dispense an item, the dispenser may simply rotate its motor until the next encoder face 3104 is seen, and then stop the motor.

In other embodiments, the motor may be turned until an item is detected by a light curtain at the bottom the dispenser. In other embodiments, dispensing may be accomplished based on the encoder position, but verified using the light curtain. In still other embodiments, different numbers of augers may be present, for example two augers or four or more augers, and gears embodying the principles of the gear set of FIGS. 30 and 31 may be used to drive the augers.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. It is to be understood that any workable combination of the elements and features disclosed herein is also considered to be disclosed.

The invention has now been described in detail for the purposes of clarity and understanding. However, those skilled in the art will appreciate that certain changes and modifications may be practiced within the scope of the appended claims.

What is claimed is:

1. A dispensing mechanism for dispensing elongate items, the dispensing mechanism comprising:
- a dispensing unit comprising a drawer;
- a dispenser, comprising:
  - at least two helical augers having threads and rotational axes;
  - at least two channels configured to hold the items to be dispensed with longitudinal axes of the items to be dispensed being generally perpendicular to the rotational axes of the at least two helical augers, and the items to be dispensed being received at least partially within the threads of the augers;
  - a mechanical drive engaged with the at least two augers and configured to rotate the at least two augers to transport the items to be dispensed, driven by the threads of the augers, to dispense the items from the dispensing mechanism;
  - an encoder coupled to the mechanical drive of the dispensing mechanism, the encoder identifying a rotational position of at least one of: the helical augers; or the mechanical drive; and
- a cassette coupled with the dispenser, wherein the cassette and the dispenser are disposed within an interior of the drawer.

2. The dispensing mechanism of claim 1, wherein each of the items to be dispensed is received at least partially within the threads of two of the augers.

3. The dispensing mechanism of claim 2, wherein the at least two helical augers are disposed with their rotation axes vertical, and the items to be dispensed are held generally horizontally within the threads of the augers.

4. The dispensing mechanism of claim 2, further comprising at least one actuator configured to drive the at least two augers in rotation.

5. The dispensing mechanism of claim 4, wherein the actuator is a motor.

6. The dispensing mechanism of claim 4, further comprising a set of gears coupled to the at least two augers, such that the rotations of the at least two augers are coordinated to transport and dispense the items.

7. The dispensing mechanism of claim 2, wherein a first one of the at least two augers has right hand threads, and a second one of the at least two augers has left hand threads.

8. The dispensing mechanism of claim 2, wherein:
- the dispensing mechanism comprises four augers and three channels, each of the three channels configured to hold a column of the items to be dispensed;
- the four augers are arranged as two front and two rear augers, and two left augers and two right augers; and
- the three channels are arranged as a left channel encompassing parts of the two left augers, a right channel encompassing parts of the two right augers, and a center channel encompassing parts of all four augers.

9. The dispensing mechanism of claim 8, further comprising a gear set coupled to all four augers such that all four augers turn synchronously when any one of the four augers turns.

10. The dispensing mechanism of claim 9, wherein the two left augers have a first handedness, and the two right augers have a second handedness, opposite the first.

11. The dispensing mechanism of claim 9, wherein right front and left rear augers have a first handedness, and left front augers and right rear augers have a second handedness, opposite the first.

12. The dispensing mechanism of claim 2, further comprising a driving gear that actuates the mechanical drive, and wherein an item is dispensed from the dispensing mechanism at intervals of 90, 120, or 180 degrees of rotation of the driving gear.

13. The dispensing mechanism of claim 1, wherein:

the dispensing mechanism comprises three augers and three channels, each of the three channels configured to hold two columns of the items to be dispensed;

the three augers are arranged as left, center, and right augers; and the three channels are arranged as a left channel encompassing the left auger, a center channel encompassing the center auger, and a vertical channel encompassing the right auger.

14. The dispensing mechanism of claim 13, wherein the three augers are disposed with their rotation axes vertical, and the items to be dispensed are held generally horizontally within the threads of the augers.

15. The dispensing mechanism of claim 13, wherein the dispensing mechanism comprises at least four augers and four channels.

16. The dispensing mechanism of claim 13, further comprising a gear set including a driving gear and respective auger gears, the gear set arranged such that the three augers rotate incrementally and sequentially as the driving gear rotates.

17. The dispensing mechanism of claim 16, wherein each of the respective auger gears has missing teeth.

18. The dispensing mechanism of claim 17, further comprising a respective timing gear for each of the three augers, wherein:

each of the timing gears has missing teeth for at least part of its height; and each of the timing gears engages with its respective auger gear such that the missing teeth of the timing gear and the missing teeth of the auger gear cause intermittent motion of the respective auger when the timing gear rotates.

19. The dispensing mechanism of claim 16, wherein an item is dispensed for each 120 degrees of rotation of the driving gear.

20. The dispensing mechanism of claim 16, further comprising an encoder that indicates a rotational position of one of the gears in the gear set.

21. The dispensing mechanism of claim 20, wherein the encoder comprises a plurality of flat reflective surfaces on one of the gears of the gear set.

22. The dispensing mechanism of claim 1, wherein the dispensing mechanism comprises a cassette, wherein the at least two helical augers and the at least two channels and the mechanical drive are comprised in the cassette.

23. The dispensing mechanism of claim 22, wherein the encoder is coupled to the cassette, and wherein the cassette comprises an opening.

24. The dispensing mechanism of claim 23, wherein the encoder comprises a reflective target between a first position and a second position, wherein the reflective target is visible through the opening when the reflective target is in the first position.

25. The dispensing mechanism of claim 24, wherein the encoder comprises a spring-loaded plunger, wherein the plunger carries the reflective target.

26. A dispensing mechanism for dispensing elongate items, the dispensing mechanism comprising:

at least two helical augers having threads and rotational axes;

at least two channels configured to hold the items to be dispensed with longitudinal axes of the items to be dispensed being generally perpendicular to the rotational axes of the at least two helical augers, and the items to be dispensed being received at least partially within the threads of the augers;

a mechanical drive engaged with the at least two augers and configured to rotate the at least two augers to transport the items to be dispensed, driven by the threads of the augers, to dispense the items from the dispensing mechanism; and an encoder coupled to the dispensing mechanism, the encoder identifying a rotational position of at least one of the helical augers; or the mechanical drive, wherein the mechanical drive comprises a plurality of gears, wherein the encoder is coupled to at least one of the plurality of gears.

27. The dispensing mechanism of claim 26, wherein the dispensing mechanism comprises a cassette, wherein the at least two helical augers and the at least two channels and the mechanical drive are comprised in the cassette, wherein the encoder is coupled to the cassette, and wherein the cassette comprises an opening.

28. The dispensing mechanism of claim 27, wherein the encoder comprises a reflective target between a first position and a second position, wherein the reflective target is visible through the opening when the reflective target is in the first position.

29. The dispensing mechanism of claim 28, wherein the encoder comprises a spring-loaded plunger, wherein the plunger carries the reflective target.

30. The dispensing mechanism of claim 26, wherein each of the items to be dispensed is received at least partially within the threads of two of the augers, wherein the at least two helical augers are disposed with their rotation axes vertical, and the items to be dispensed are held generally horizontally within the threads of the augers.

31. The dispensing mechanism of claim 30, further comprising at least one actuator configured to drive the at least two augers in rotation.

32. The dispensing mechanism of claim 31, wherein the actuator is a motor.

33. The dispensing mechanism of claim 31, further comprising a set of gears coupled to the at least two augers, such that the rotations of the at least two augers are coordinated to transport and dispense the items.

34. The dispensing mechanism of claim 30, wherein a first one of the at least two augers has right hand threads, and a second one of the at least two augers has left hand threads.

* * * * *